US012638877B2

(12) United States Patent
Zhang et al.

(10) Patent No.: US 12,638,877 B2
(45) Date of Patent: May 26, 2026

(54) PIVOTABLE SUPPORT APPARATUS AND DISPLAY APPARATUS

(71) Applicant: BOE Technology Group Co., Ltd., Beijing (CN)

(72) Inventors: Shouchuan Zhang, Beijing (CN); Yonghong Zhou, Beijing (CN)

(73) Assignee: BOE Technolgy Group Co., Ltd., Beijing (CN)

( * ) Notice: Subject to any disclaimer, the term of this patent is extended or adjusted under 35 U.S.C. 154(b) by 139 days.

(21) Appl. No.: 18/817,246

(22) Filed: Aug. 28, 2024

(65) Prior Publication Data

US 2026/0064152 A1      Mar. 5, 2026

(51) Int. Cl.
*G06F 1/16*          (2006.01)

(52) U.S. Cl.
CPC .......... *G06F 1/1616* (2013.01); *G06F 1/1652* (2013.01); *G06F 1/1681* (2013.01)

(58) Field of Classification Search
CPC ...................................................... G06F 1/1652
See application file for complete search history.

(56) References Cited

U.S. PATENT DOCUMENTS

| | | | | | |
|---|---|---|---|---|---|
| 8,804,349 | B2 * | 8/2014 | Lee | ........................ | G06F 1/1652 |
| | | | | | 361/679.01 |
| 9,164,547 | B1 * | 10/2015 | Kwon | .................... | G06F 1/1652 |
| 9,204,565 | B1 * | 12/2015 | Lee | ........................... | E05D 7/00 |

| | | | | | |
|---|---|---|---|---|---|
| 9,557,771 | B2 * | 1/2017 | Park | .................... | H04M 1/0237 |
| 9,603,271 | B2 * | 3/2017 | Lee | .......................... | G09F 9/301 |
| 9,606,583 | B2 * | 3/2017 | Ahn | ........................ | G06F 1/1681 |
| 9,684,343 | B2 * | 6/2017 | Tazbaz | .................. | G06F 1/1681 |
| 9,798,359 | B2 * | 10/2017 | Seo | ........................ | G06F 1/1652 |
| 9,848,502 | B1 * | 12/2017 | Chu | ........................ | G06F 1/1681 |
| 9,870,031 | B2 * | 1/2018 | Hsu | ........................ | G06F 1/1681 |
| 10,082,838 | B1 * | 9/2018 | Hong | .................... | G06F 1/1656 |
| 10,394,062 | B1 | 8/2019 | Song | | |
| 10,817,030 | B2 * | 10/2020 | Pelissier | .............. | G06F 1/1641 |
| 11,449,103 | B2 * | 9/2022 | Zhou | .................... | G06F 1/1652 |

(Continued)

FOREIGN PATENT DOCUMENTS

| | | |
|---|---|---|
| CN | 105830140 A | 8/2016 |
| CN | 109922181 A | 6/2019 |

(Continued)

OTHER PUBLICATIONS

First Office Action in the Chinese Patent Application No. 202180002699.3, dated Oct. 31, 2025; English translation attached.

*Primary Examiner* — Adrian S Wilson

(74) *Attorney, Agent, or Firm* — Intellectual Valley Law, P.C.

(57)          ABSTRACT

A pivotable support apparatus for supporting a foldable display panel is provided. The pivotable support apparatus includes a cladding board having a first side portion and a second side portion; a first rotating plate rotatably attached to the first side portion; a second rotating plate rotatably attached to the second side portion; a first sliding plate slidably attached to the first rotating plate; a second sliding plate slidably attached to the second rotating plate; a first frame rotatably attached to the first sliding plate; and a second frame rotatably attached to the second sliding plate.

20 Claims, 19 Drawing Sheets

(56)    References Cited

U.S. PATENT DOCUMENTS

| | | | |
|---|---|---|---|
| 11,647,599 B2* | 5/2023 | Zhang | G06F 1/1681 |
| | | | 361/807 |
| 11,729,929 B2* | 8/2023 | Zhang | G09F 9/301 |
| | | | 361/807 |
| 12,153,472 B2* | 11/2024 | Seo | G06F 1/1652 |
| 2012/0264489 A1* | 10/2012 | Choi | H04M 1/0247 |
| | | | 455/566 |
| 2012/0307423 A1* | 12/2012 | Bohn | H04M 1/0216 |
| | | | 361/679.01 |
| 2013/0021762 A1* | 1/2013 | van Dijk | G09F 9/301 |
| | | | 361/749 |
| 2014/0042293 A1* | 2/2014 | Mok | H04M 1/0216 |
| | | | 248/682 |
| 2014/0111954 A1* | 4/2014 | Lee | G06F 1/1641 |
| | | | 361/749 |
| 2014/0226275 A1* | 8/2014 | Ko | G06F 1/1601 |
| | | | 361/679.27 |
| 2018/0077808 A1* | 3/2018 | Seo | G06F 3/04164 |
| 2018/0188778 A1* | 7/2018 | Shin | G06F 1/1652 |
| 2020/0225711 A1* | 7/2020 | Pelissier | G06F 1/1624 |
| 2021/0068270 A1* | 3/2021 | Zhou | G06F 1/1652 |
| 2022/0124923 A1* | 4/2022 | Zhang | H05K 5/0217 |
| 2022/0317734 A1* | 10/2022 | Zhang | G06F 1/1683 |
| 2022/0400564 A1* | 12/2022 | Zhang | F16C 11/04 |
| 2024/0023261 A1* | 1/2024 | Park | F16C 11/04 |
| 2024/0205313 A1* | 6/2024 | Kim | G06F 1/1681 |

FOREIGN PATENT DOCUMENTS

| | | | | |
|---|---|---|---|---|
| CN | 111629087 A | | 9/2020 | |
| CN | 112150921 A | * | 12/2020 | G06F 1/1616 |
| KR | 20200141820 A | | 12/2020 | |

* cited by examiner

ZR1

460

470

451

481

600

620

610

300

601
621
611
301

PIVOTABLE SUPPORT APPARATUS AND DISPLAY APPARATUS

CROSS-REFERENCE TO RELATED APPLICATION

This application is a continuation of U.S. application Ser. No. 17/789,178, filed Sep. 27, 2021, which a national stage application under 35 U.S.C. § 371 of International Application No. PCT/CN2021/120860, filed Sep. 27, 2021. Each of the forgoing applications is herein incorporated by reference in its entirety for all purposes.

TECHNICAL FIELD

The present invention relates to display technology, more particularly, to a pivotable support apparatus and a display apparatus.

BACKGROUND

Portable display devices such as foldable and flexible display devices have become a focus of research and development in display technology in recent years. A flexible display device is a bendable or deformable display device having a flexible display panel. Examples of flexible display devices include a flexible organic light emitting display (OLED) device, a flexible electrophoretic display (EPD) device, and a flexible liquid crystal display (LCD) device. As a new generation display device, the flexible display device is thinner and tighter, having high contrast, high responsiveness, and high brightness. It also provides full color and a wide viewing angle. The flexible display device has found a wide range of applications in mobiles phones, personal digital assistance (PDAs), digital cameras, on-board displays, notebook computers, on-wall televisions, as well as various military applications. A flexible display device includes a flexible array substrate. A base substrate of the flexible array substrate can be made of flexible material such as plastic.

SUMMARY

In one aspect, the present disclosure provides a pivotable support apparatus for supporting a foldable display panel, comprising a cladding board having a first side portion and a second side portion; a first rotating plate rotatably attached to the first side portion; a second rotating plate rotatably attached to the second side portion; a first sliding plate slidably attached to the first rotating plate; a second sliding plate slidably attached to the second rotating plate; a first frame rotatably attached to the first sliding plate; and a second frame rotatably attached to the second sliding plate.

Optionally, in a folded state of the pivotable support apparatus, a first included angle between the first sliding plate and the second sliding plate or between the first rotating plate and the second rotating plate is greater than a second included angle between the first frame and the second frame.

Optionally, in a folded state of the pivotable support apparatus, the first rotating plate and the second rotating plate are spaced apart by a first distance where they are connected to the cladding board, respectively; the first sliding plate and the second sliding plate are spaced apart by a second distance where they are connected to the first frame and the second frame, respectively; and the first distance is greater than the second distance.

Optionally, in an unfolded state of the pivotable support apparatus, the first rotating plate, the second rotating plate, the first sliding plate, the second sliding plate form parts of a substantially flat surface for supporting the foldable display panel.

Optionally, the first rotating plate comprises at least a first insert, the first sliding plate comprises at least a first slot configured to receive the first insert, allowing the first sliding plate to slidably move relatively to the first rotating plate; in a process of unfolding the pivotable support apparatus, the first sliding plate and the first rotating plate are configured to move toward each other; and in a process of folding the pivotable support apparatus, the first sliding plate and the first rotating plate are configured to move away from each other.

Optionally, the second rotating plate comprises at least a second insert, the second sliding plate comprises at least a second slot configured to receive the second insert, allowing the second sliding plate to move relatively to the second rotating plate; in a process of unfolding the pivotable support apparatus, the second sliding plate and the second rotating plate are configured to move toward each other; and in a process of folding the pivotable support apparatus, the second sliding plate and the second rotating plate are configured to move away from each other.

Optionally, the first rotating plate comprises at least a first shaft, the first side portion comprises at least a first receiving hole configured to receive the first shaft; the first sliding plate comprises at least a third shaft, the first frame comprises at least a third receiving hole configured to receive the third shaft; the first rotating plate and the first side portion being configured to rotate with respect to each other about the first shaft; and the first sliding plate and the first frame being configured to rotate with respect to each other about the third shaft.

Optionally, the second rotating plate comprises at least a second shaft, the second side portion comprises at least a second receiving hole configured to receive the second shaft; the second sliding plate comprises at least a fourth shaft, the second frame comprises at least a fourth receiving hole configured to receive the fourth shaft; the second rotating plate and the second side portion are configured to rotate with respect to each other about the second shaft; and the second sliding plate and the second frame are configured to rotate with respect to each other about the fourth shaft.

Optionally, the pivotable support apparatus further comprises a support plate received by the cladding board, the support plate being movable between a first position and a second position.

Optionally, in an unfolded state of the pivotable support apparatus, the support plate is at the first position, the first rotating plate, the second rotating plate, the first sliding plate, the second sliding plate, and the support plate form parts of a substantially flat surface for supporting the foldable display panel; and in a folded state of the pivotable support apparatus, the support plate is received between the first side portion and the second side portion of the cladding board at the second position.

Optionally, the first frame comprises a first limiting post; the second frame comprises a second limiting post; the support plate comprises a first sliding slot configured to receive the first limiting post and a second sliding slot configured to receive the second limiting post; the first limiting post is configured to be slidably attached to the support plate; and the second limiting post is configured to be slidably attached to the support plate.

Optionally, from an unfolded state to a folded state, the first limiting post and the second limiting post are configured to drive the support plate from a first position to a second position; and the support plate at the second position is further away from where a first rotating plate and a second rotating plate are connected to the cladding board as compared to the support plate at the first position.

Optionally, the first frame comprises a first side post, the cladding board comprises a first side receiving hole configured to receive the first side post, thereby rotatably attaching the first frame to the cladding board; and the second frame comprises a second side post, the cladding board comprises a second side receiving hole configured to receive the second side post, thereby rotatably attaching the second frame to the cladding board.

Optionally, the pivotable support apparatus further comprises a hinge structure comprising a first main shaft and a second main shaft; and a synchronized gear configured to synchronize rotation of the first main shaft and the second main shaft.

Optionally, the synchronized gear comprises a first gear and a second gear configured to rotate about the first main shaft and the second main shaft, respectively; the first gear and the second gear are configured to be engaged with each other; the first frame comprises a third gear configured to be engaged with the first gear; and the second frame comprises a fourth gear configured to be engaged with the second gear.

Optionally, the first frame comprises a first limiting post and a first side post; the first limiting post and the first side post are connected to the third gear on opposite sides of the third gear, respectively; the second frame comprises a second limiting post and a second side post; the second limiting post and the second side post are connected to the fourth gear on opposite sides of the fourth gear, respectively.

Optionally, the second included angle is in a range of 0 degree to 5 degrees; and the first included angle is in a range of 10 degree to 50 degrees.

Optionally, a ratio of the first distance to the second distance is in a range of 3 to 100.

In another aspect, the present disclosure provides a display apparatus, comprising a foldable display panel and a pivotable support apparatus described herein or fabricated by a method described herein.

Optionally, in a folded state of the display apparatus, the first rotating plate and the second rotating plate are spaced apart by a first distance where they are connected to the cladding board, respectively; the first sliding plate and the second sliding plate are spaced apart by a second distance where they are connected to the first frame and the second frame, respectively; the first distance is greater than the second distance; a portion of the foldable display panel in contact with the first frame and a portion of the foldable display panel in contact with the second frame are spaced apart by a third distance; and the first distance is greater than the third distance.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a pivotable support apparatus and a display apparatus that substantially obviate one or more of the problems due to limitations and disadvantages of the related art. In one aspect, the present disclosure provides a pivotable support apparatus for supporting a foldable display panel. In some embodiments, the pivotable support apparatus includes a cladding board having a first side portion and a second side portion; a first rotating plate rotatably attached to the first side portion; a second rotating plate rotatably attached to the second side portion; a first sliding plate slidably attached to the first rotating plate; a second sliding plate slidably attached to the second rotating plate; a first frame rotatably attached to the first sliding plate; and a second frame rotatably attached to the second sliding plate.

Figure 1:
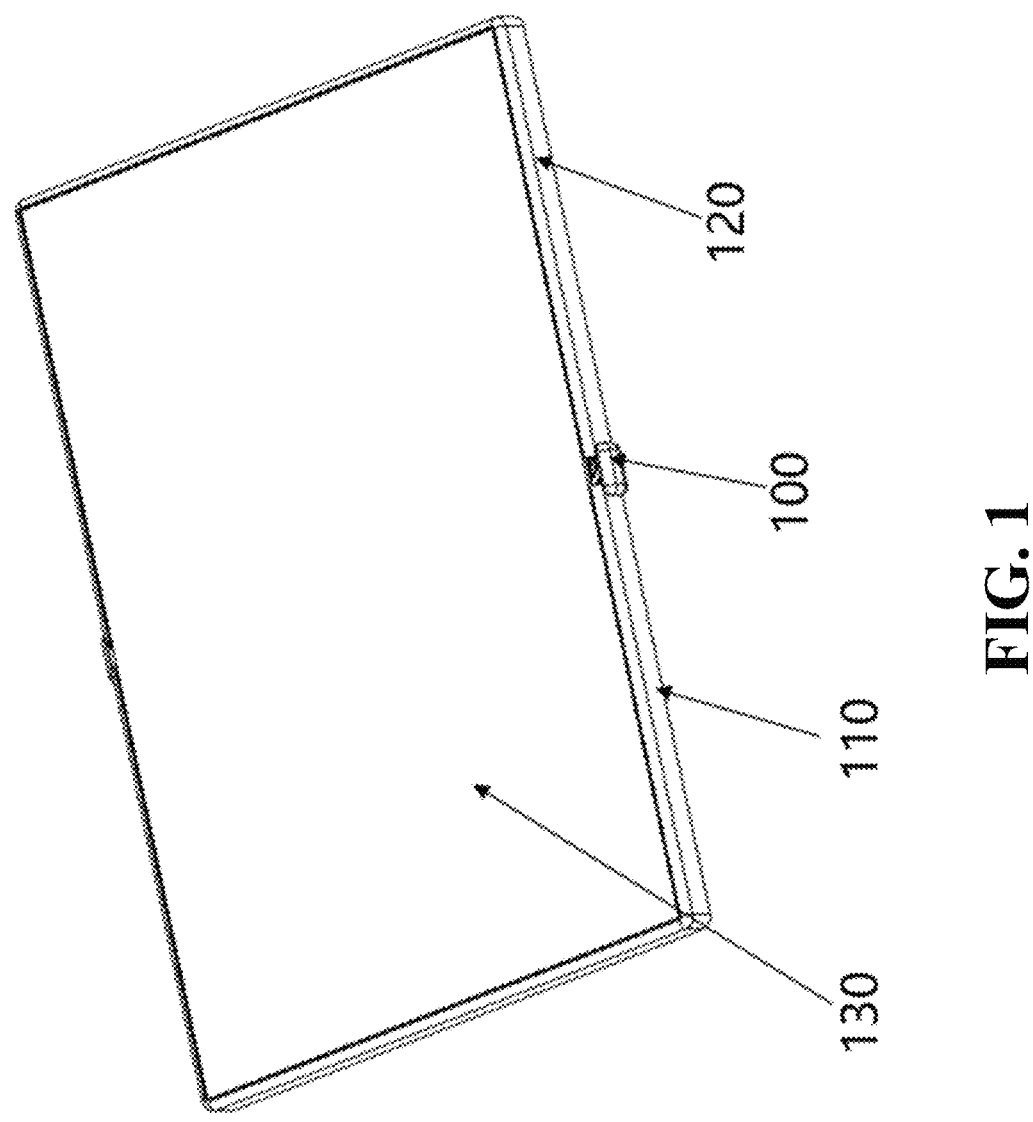
FIG. 1 is a perspective view of a pivotable support apparatus in an unfolded state and a foldable display panel supported thereon in some embodiments according to the present disclosure.
Figure 2:
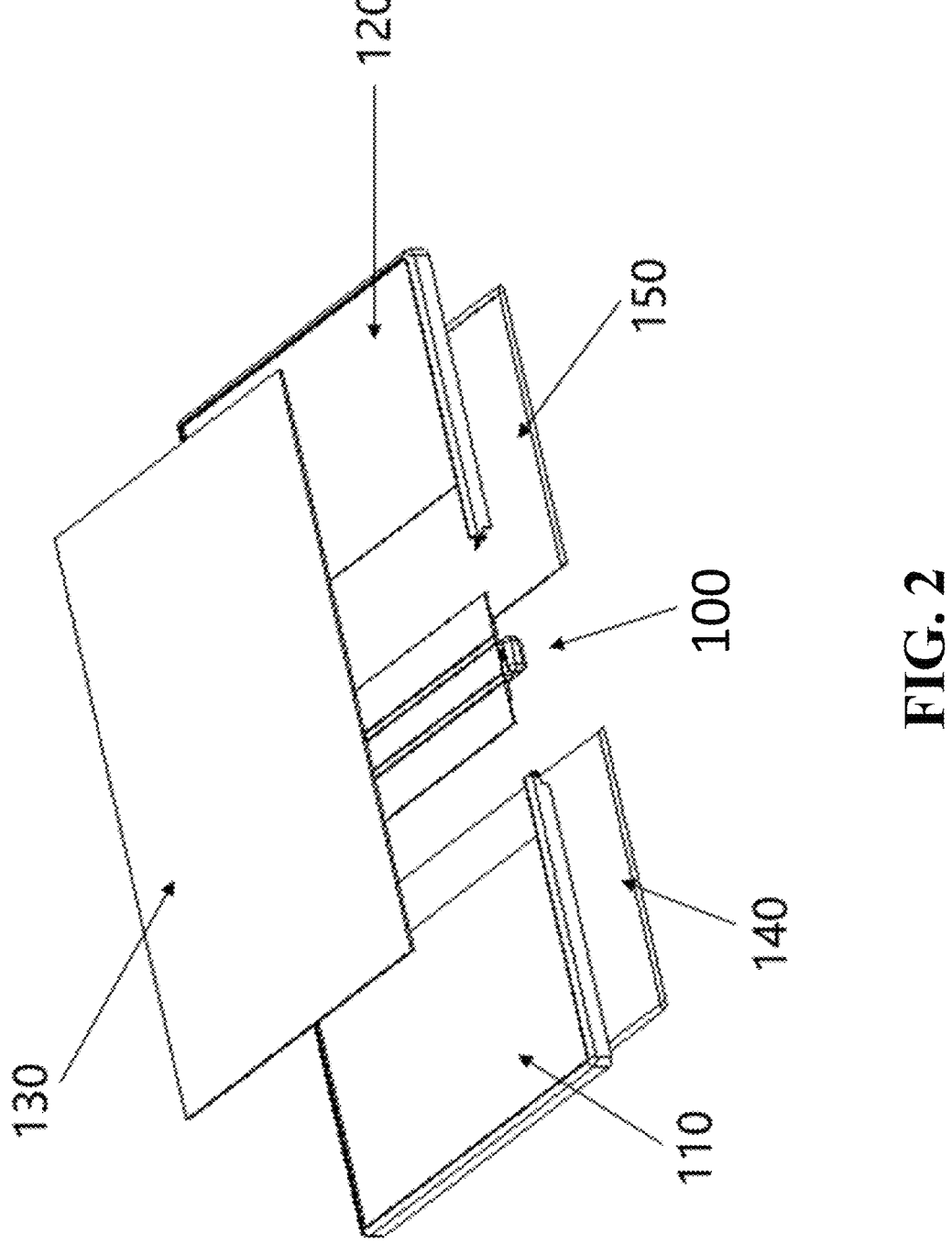
FIG. 2 is an exploded view of a pivotable support apparatus in an unfolded state and a foldable display panel supported thereon in some embodiments according to the present disclosure.

FIG. 1 is a perspective view of a pivotable support apparatus in an unfolded state and a foldable display panel supported thereon in some embodiments according to the present disclosure. FIG. 2 is an exploded view of a pivotable support apparatus in an unfolded state and a foldable display panel supported thereon in some embodiments according to the present disclosure. Referring to FIG. 1 and FIG. 2, the pivotable support apparatus in some embodiments includes a cladding board 100, and a first frame 110 and a second frame 120 attached to the cladding board 100. Optionally, the pivotable support apparatus further includes a first back cover 140 and a second back cover 150 covering back sides of the first frame 110 and the second frame 120, respectively. As shown in FIG. 2, a foldable display panel 130 may be supported on front sides of the first frame 110 and the second frame 120.

Figure 3:
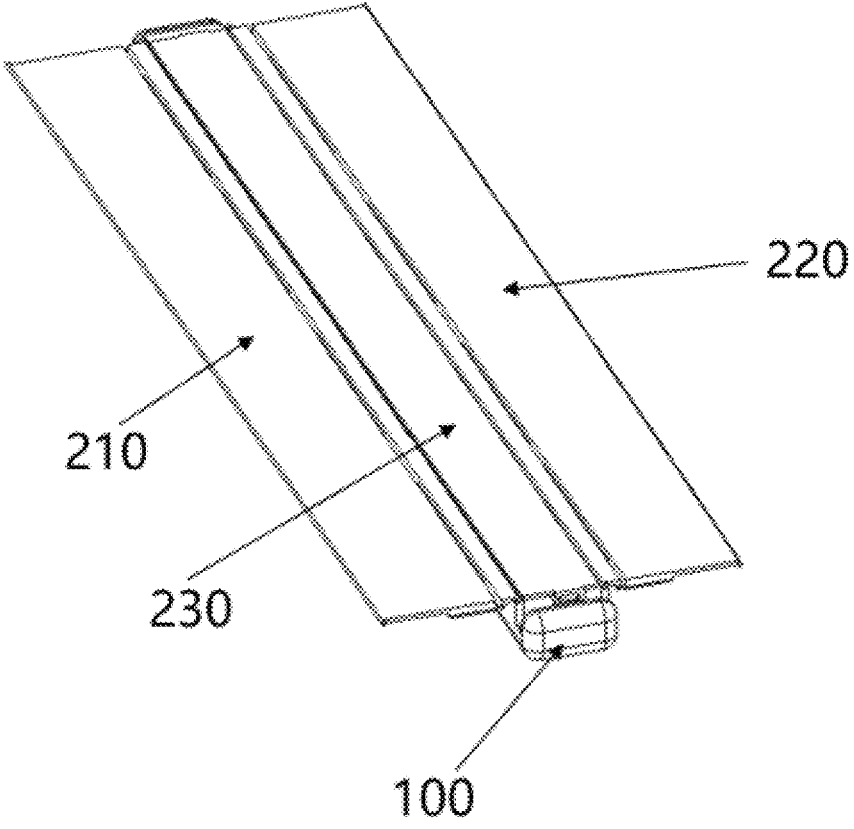
FIG. 3 is a perspective view of a pivotable support apparatus in an unfolded state in some embodiments according to the present disclosure.
Figure 4:
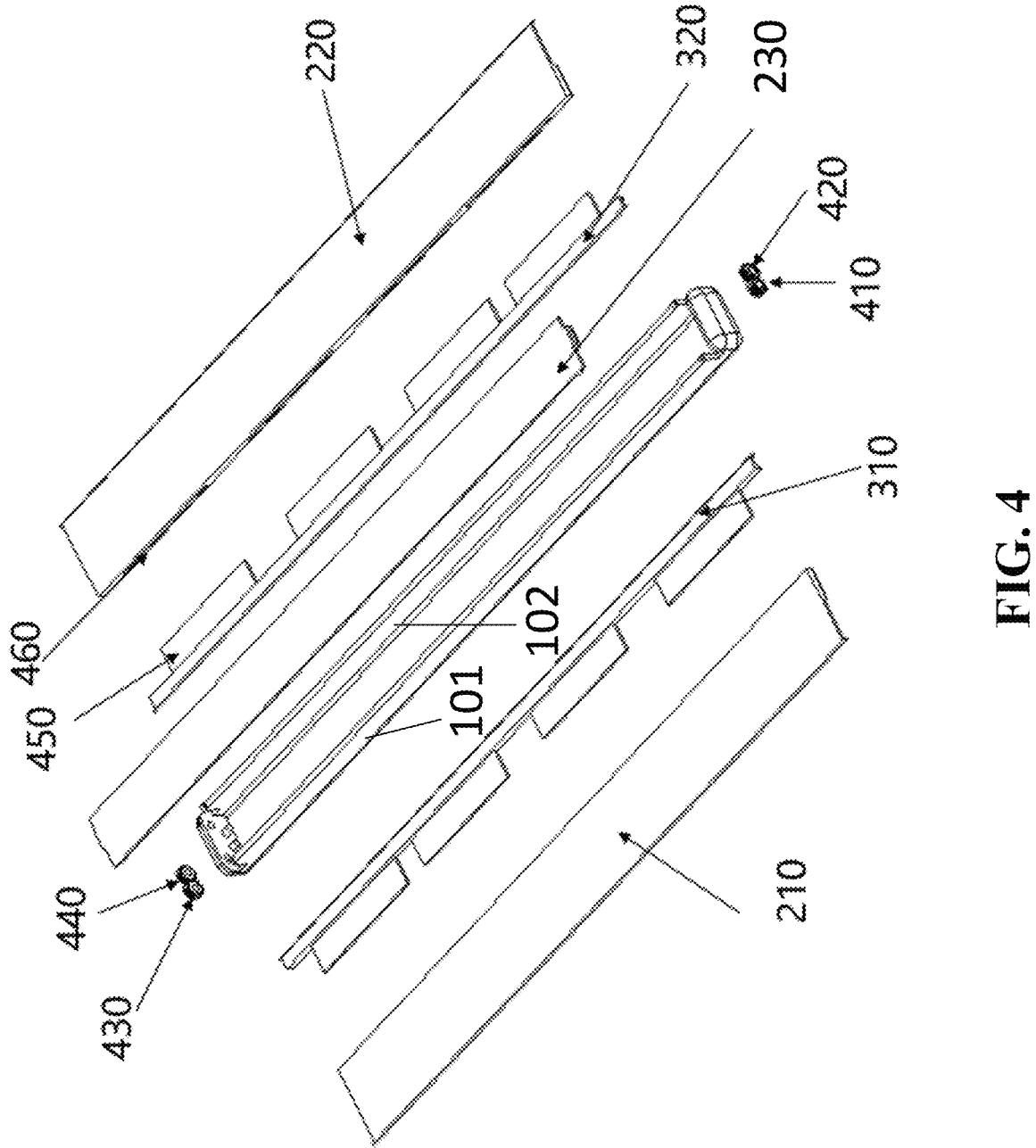
FIG. 4 is an exploded view of a pivotable support apparatus in an unfolded state in some embodiments according to the present disclosure.

FIG. 3 is a perspective view of a pivotable support apparatus in an unfolded state in some embodiments according to the present disclosure. FIG. 4 is an exploded view of a pivotable support apparatus in an unfolded state in some embodiments according to the present disclosure. Referring to FIG. 3 and FIG. 4, the pivotable support apparatus in some embodiments further includes a first rotating plate 310, a second rotating plate 320, a first sliding plate 210, a second sliding plate 220, and a support plate 230. The cladding board 100 has a first side portion 101 and a second side portion 102.

Figure 5:
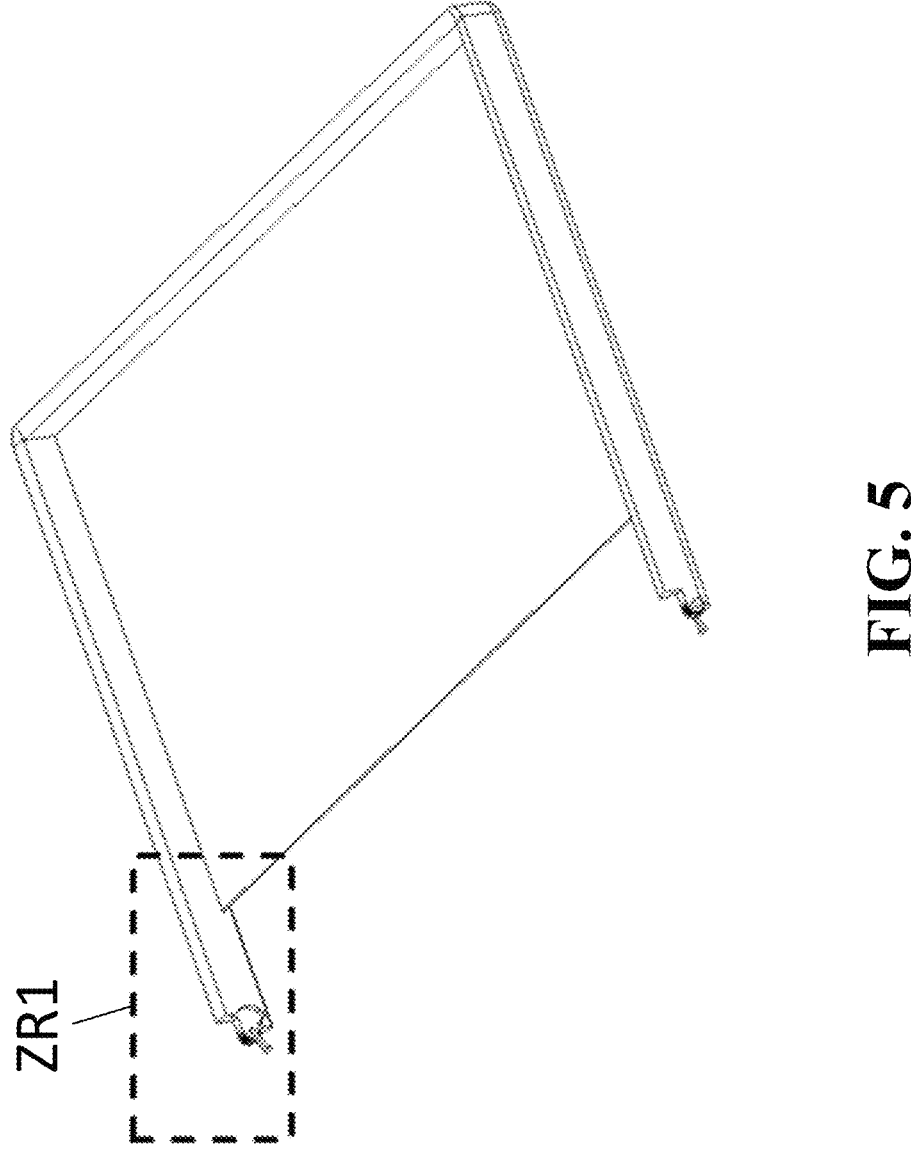
FIG. 5 is a perspective view of a first frame in some embodiments according to the present disclosure.
Figure 6A:
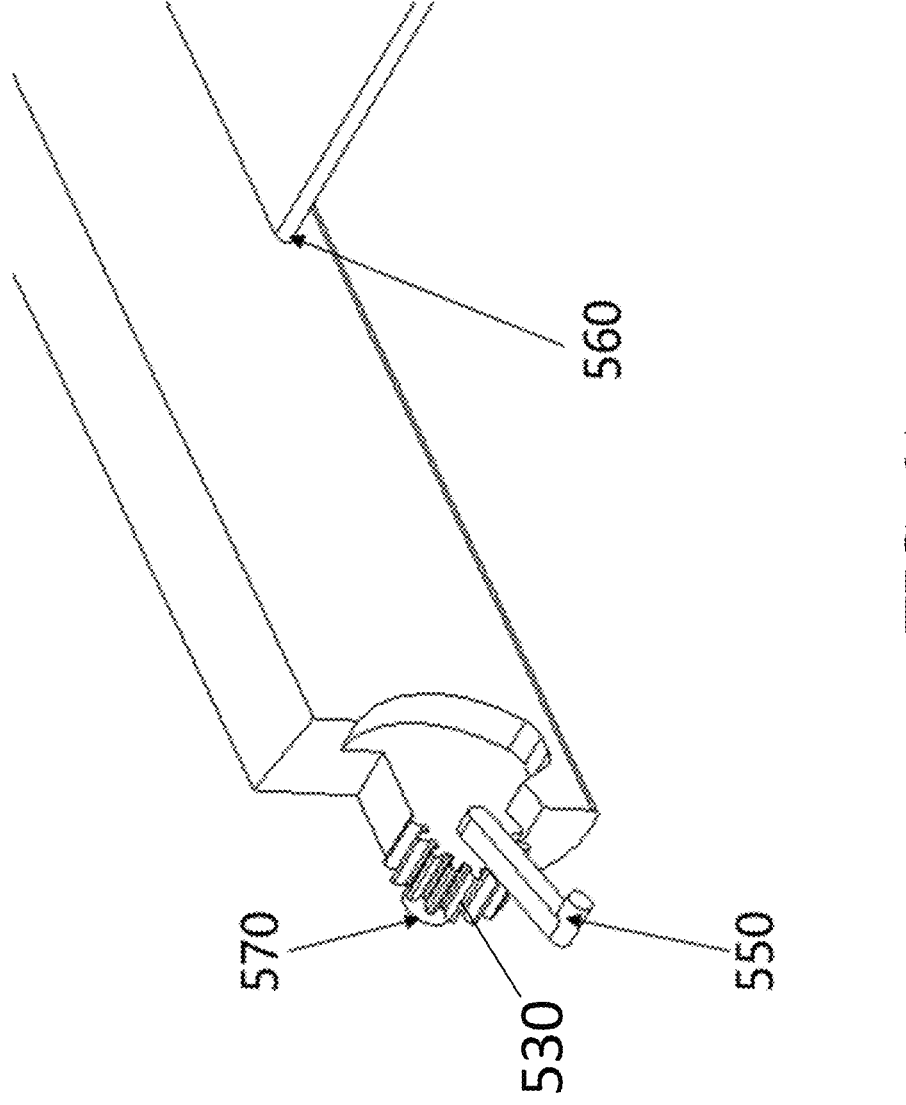
FIG. 6A is a zoom-in view of a first frame in a first zoom-in region in FIG. 5.

FIG. 5 is a perspective view of a first frame in some embodiments according to the present disclosure. FIG. 6A is a zoom-in view of a first frame in a first zoom-in region ZR1 in FIG. 5. Referring to FIG. 5 and FIG. 6A, the first frame in some embodiments includes a third receiving hole 560, a first limiting post 550, a first side post 570, and a third gear 530. The first limiting post 550 and the first side post 570 are on opposite sides of the third gear 530.

Figure 6B:
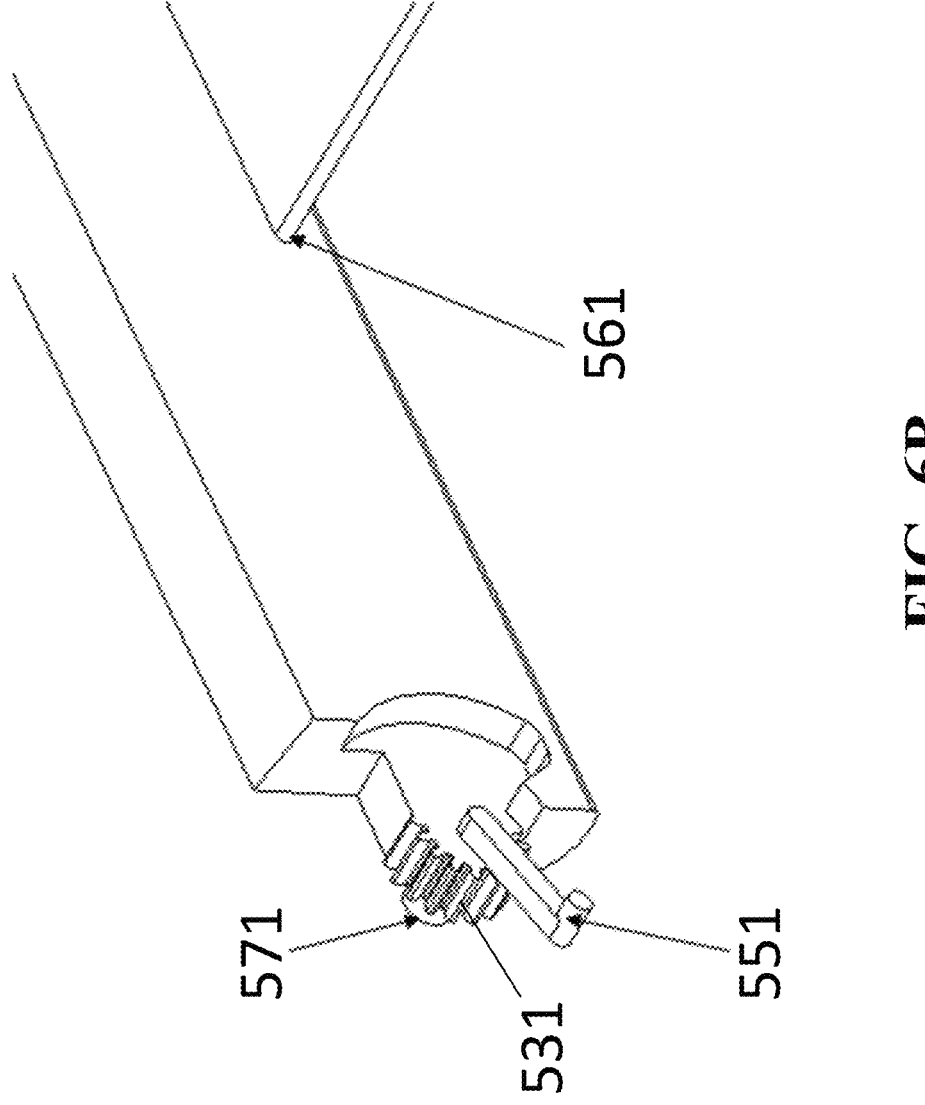
FIG. 6B is a zoom-in view of a second frame in a region corresponding to the first zoom-in region in FIG. 5.

The second frame in some embodiments has a structure similar to that of the first frame. FIG. 6B is a zoom-in view of a second frame in a region corresponding to the first zoom-in region in FIG. 5. In one example, the second frame includes a fourth receiving hole 561, a second limiting post 551, a second side post 571, and a fourth gear 531. The second limiting post 551 and the first side post 570 are on opposite sides of the fourth gear 531.

Figure 7A:
FIG. 7A is a perspective view of a first sliding plate in some embodiments according to the present disclosure.

FIG. 7A is a perspective view of a first sliding plate in some embodiments according to the present disclosure. Referring to FIG. 7A, the first sliding plate in some embodiments includes at least a first slot 460, and at least a third shaft 470. As shown in FIG. 7A, in one example, the first sliding plate includes multiple first slots and multiple third shafts. For example, the first sliding plate may have two third shafts on two opposite sides of the first sliding plate in a direction parallel to a direction along which the pivotable support apparatus is folded or unfolded. In another example, the two third shafts on two opposite sides of the first sliding plate are arranged in a direction parallel to a direction by which the multiple first slots are arranged.

Figure 7B:
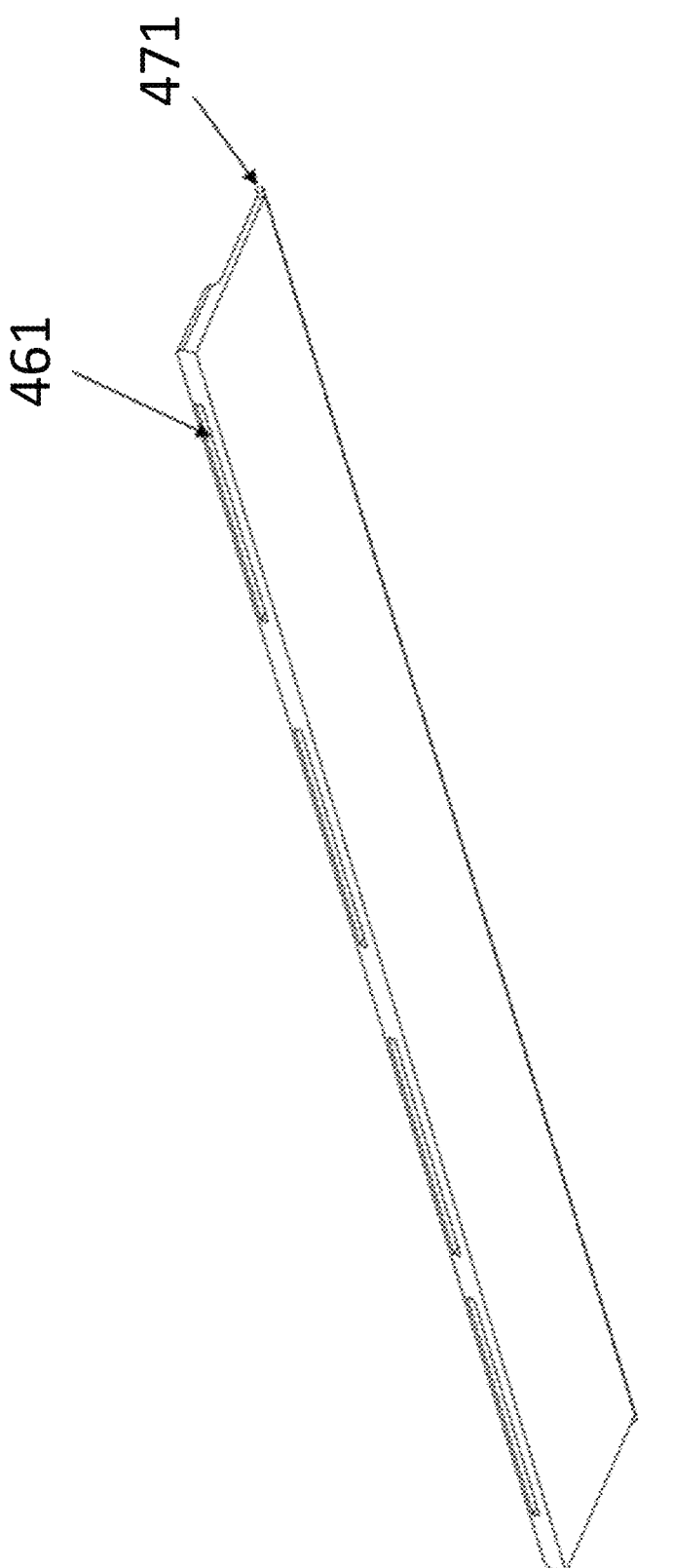
FIG. 7B is a perspective view of a second sliding plate in some embodiments according to the present disclosure.

FIG. 7B is a perspective view of a second sliding plate in some embodiments according to the present disclosure. Referring to FIG. 7B, the second sliding plate in some embodiments includes at least a second slot 461, and at least a fourth shaft 471. As shown in FIG. 7B, in one example, the second sliding plate includes multiple second slots and multiple fourth shafts. For example, the second sliding plate may have two fourth shafts on two opposite sides of the second sliding plate in a direction parallel to a direction along which the pivotable support apparatus is folded or unfolded. In another example, the two fourth shafts on two opposite sides of the second sliding plate are arranged in a direction parallel to a direction by which the multiple second slots are arranged.

Figure 8A:
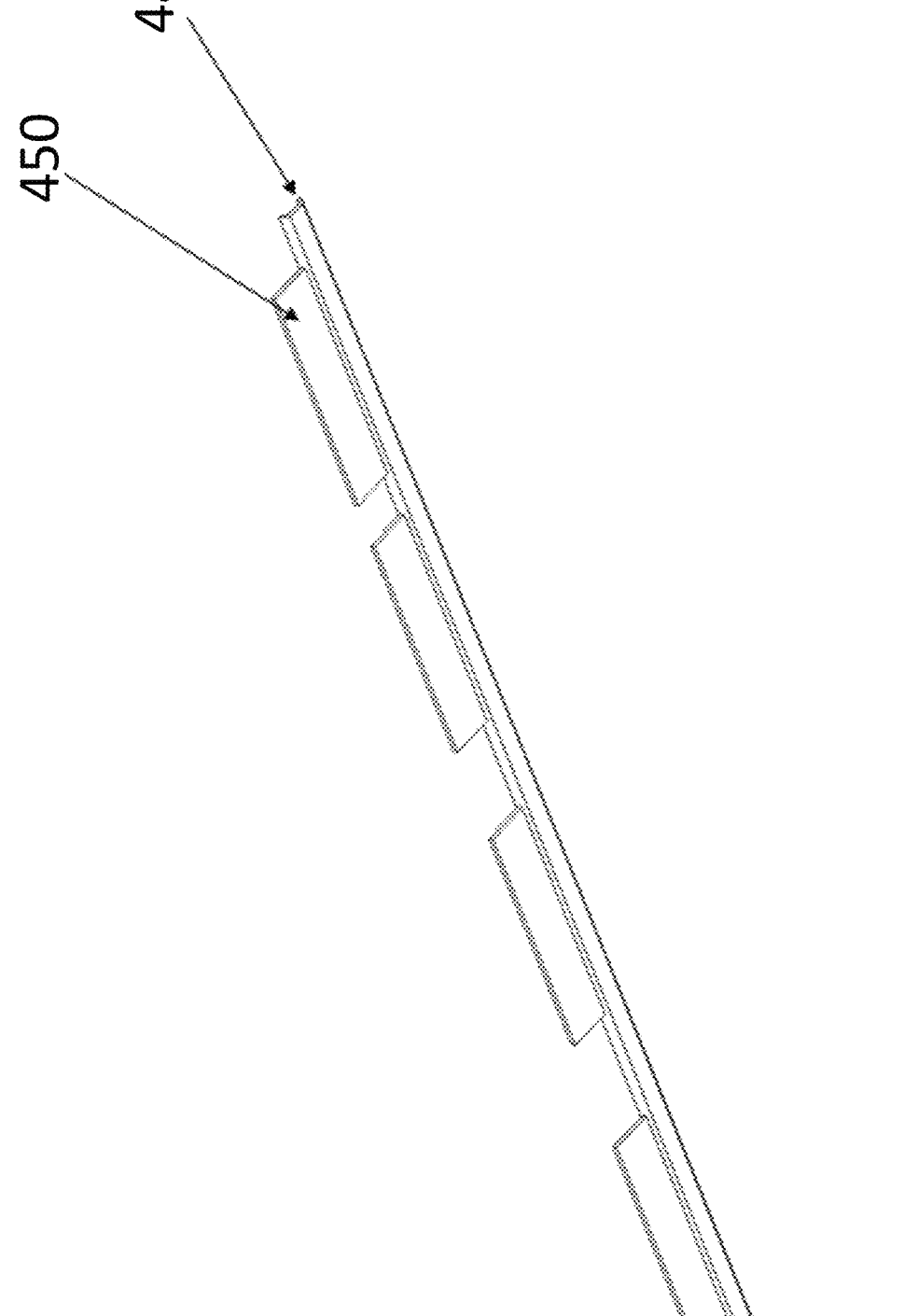
FIG. 8A is a perspective view of a first rotating plate in some embodiments according to the present disclosure.

FIG. 8A is a perspective view of a first rotating plate in some embodiments according to the present disclosure. Referring to FIG. 8A, the first rotating plate in some embodiments includes at least a first insert 450, and at least a first shaft 480. As shown in FIG. 8A, in one example, the first rotating plate includes multiple first inserts and multiple first shafts. For example, the first rotating plate may have two first shafts on two opposite sides of the first rotating plate in a direction parallel to a direction along which the pivotable support apparatus is folded or unfolded. In another example, the two first shafts on two opposite sides of the first rotating plate are arranged in a direction parallel to a direction by which the multiple first inserts are arranged.

Figure 8B:
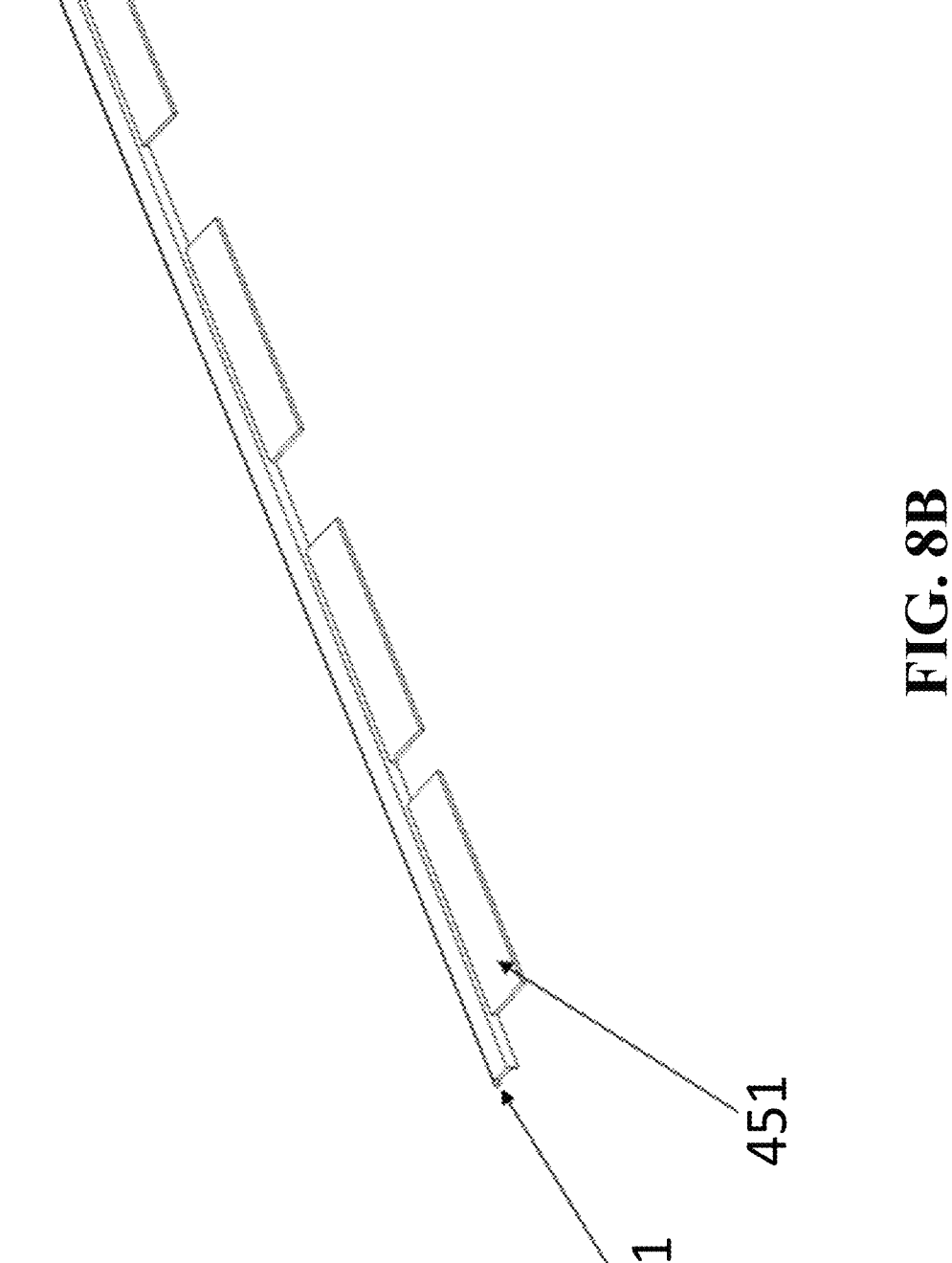
FIG. 8B is a perspective view of a second rotating plate in some embodiments according to the present disclosure.

FIG. 8B is a perspective view of a second rotating plate in some embodiments according to the present disclosure. Referring to FIG. 8B, the second rotating plate in some embodiments includes at least a second insert 451, and at least a second shaft 481. As shown in FIG. 8B, in one example, the second rotating plate includes multiple second inserts and multiple second shafts. For example, the second rotating plate may have two second shafts on two opposite sides of the second rotating plate in a direction parallel to a direction along which the pivotable support apparatus is folded or unfolded. In another example, the two second shafts on two opposite sides of the second rotating plate are arranged in a direction parallel to a direction by which the multiple second inserts are arranged.

Figure 9:
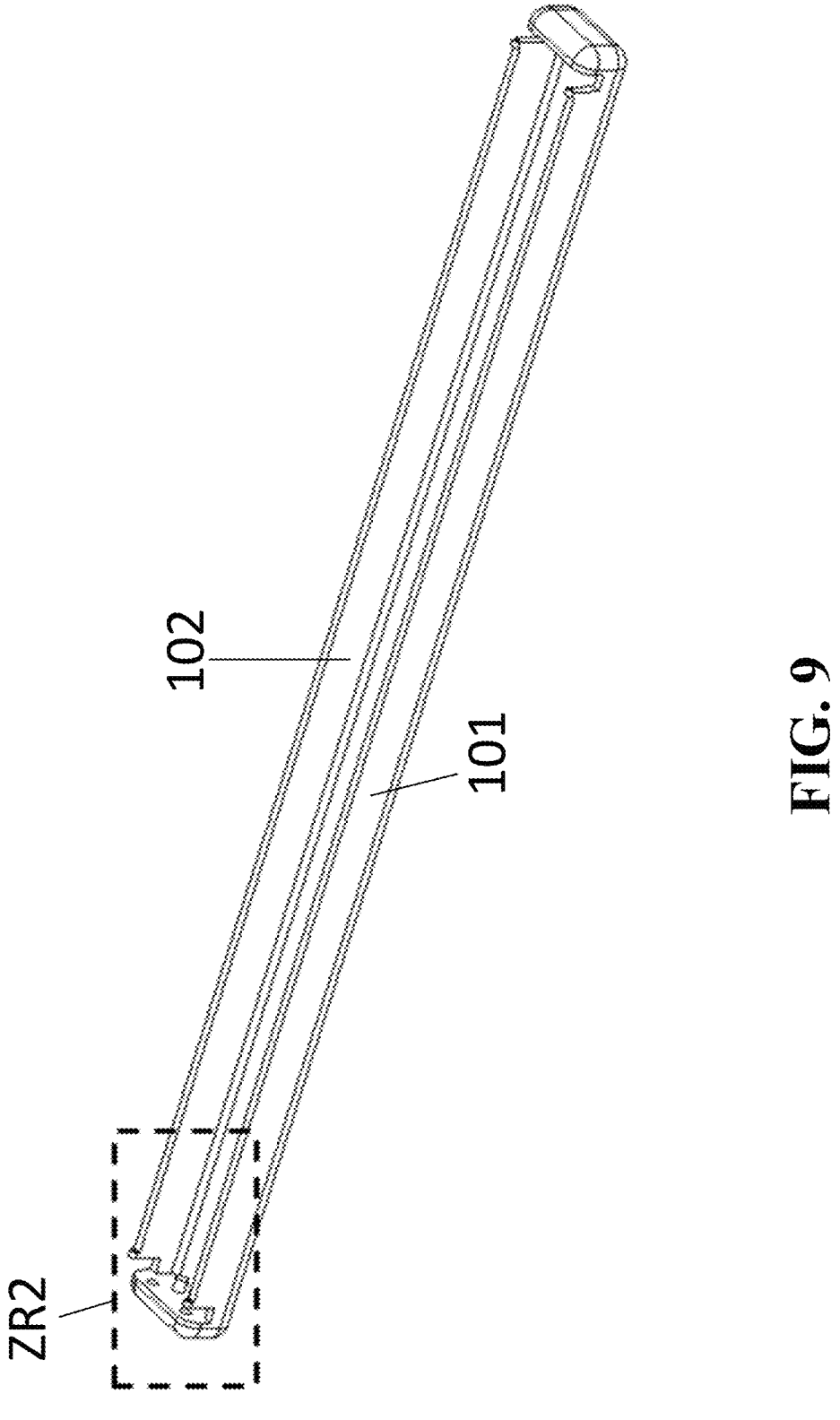
FIG. 9 is a perspective view of a cladding board in some embodiments according to the present disclosure.
Figure 10:
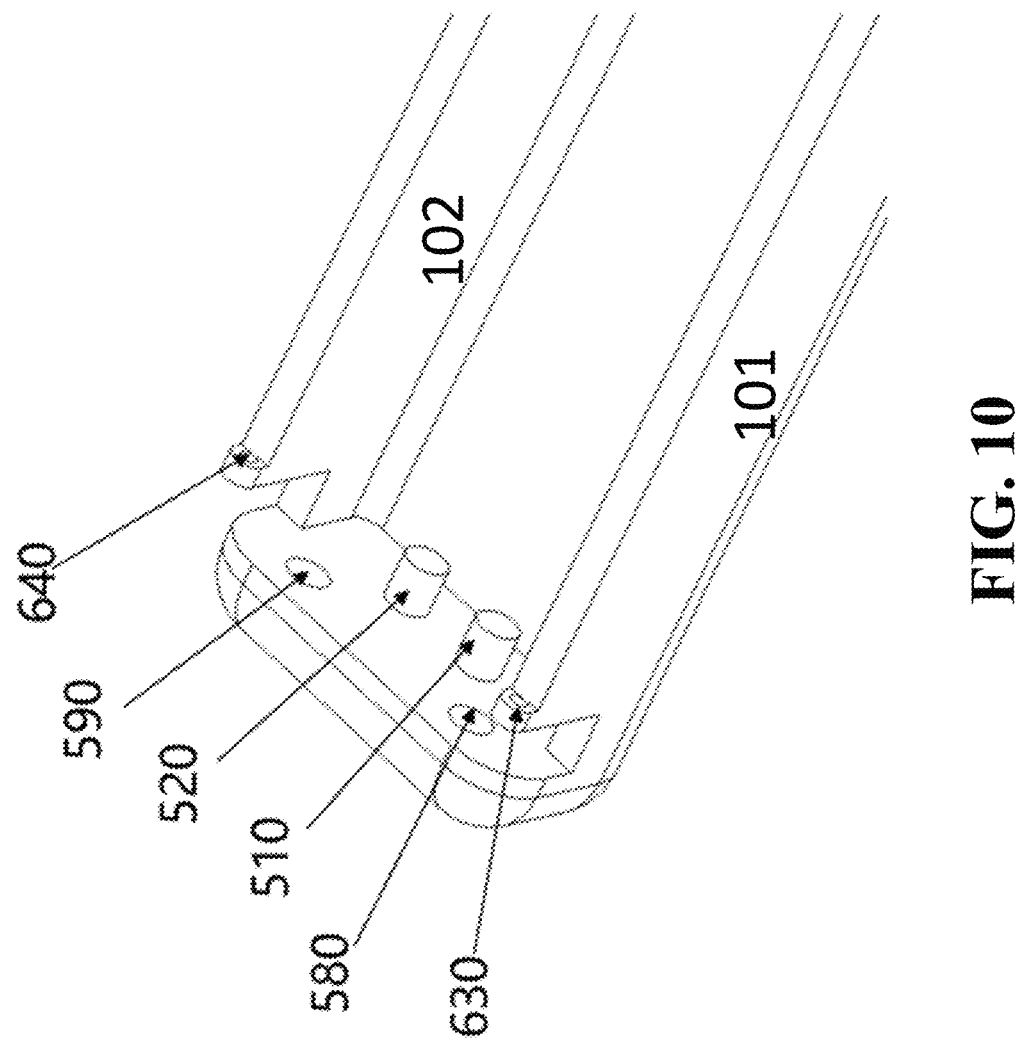
FIG. 10 is a zoom-in view of a cladding board in a second zoom-in region in FIG. 9.

FIG. 9 is a perspective view of a cladding board in some embodiments according to the present disclosure. FIG. 10 is a zoom-in view of a cladding board in a second zoom-in region ZR2 in FIG. 9. Referring to FIG. 9 and FIG. 10, in some embodiments, the first side portion 101 includes a at least a first receiving hole 630, and the second side portion 102 includes at least a second receiving hole 640. The cladding board in some embodiments includes a first side receiving hole 580 and a second side receiving hole 590.

In some embodiments, the pivotable support apparatus further includes a hinge structure. The hinge structure includes a first main shaft 510 and a second main shaft 520 respectively providing a first rotational axis and a second rotational axis parallel to each other.

Figure 11:
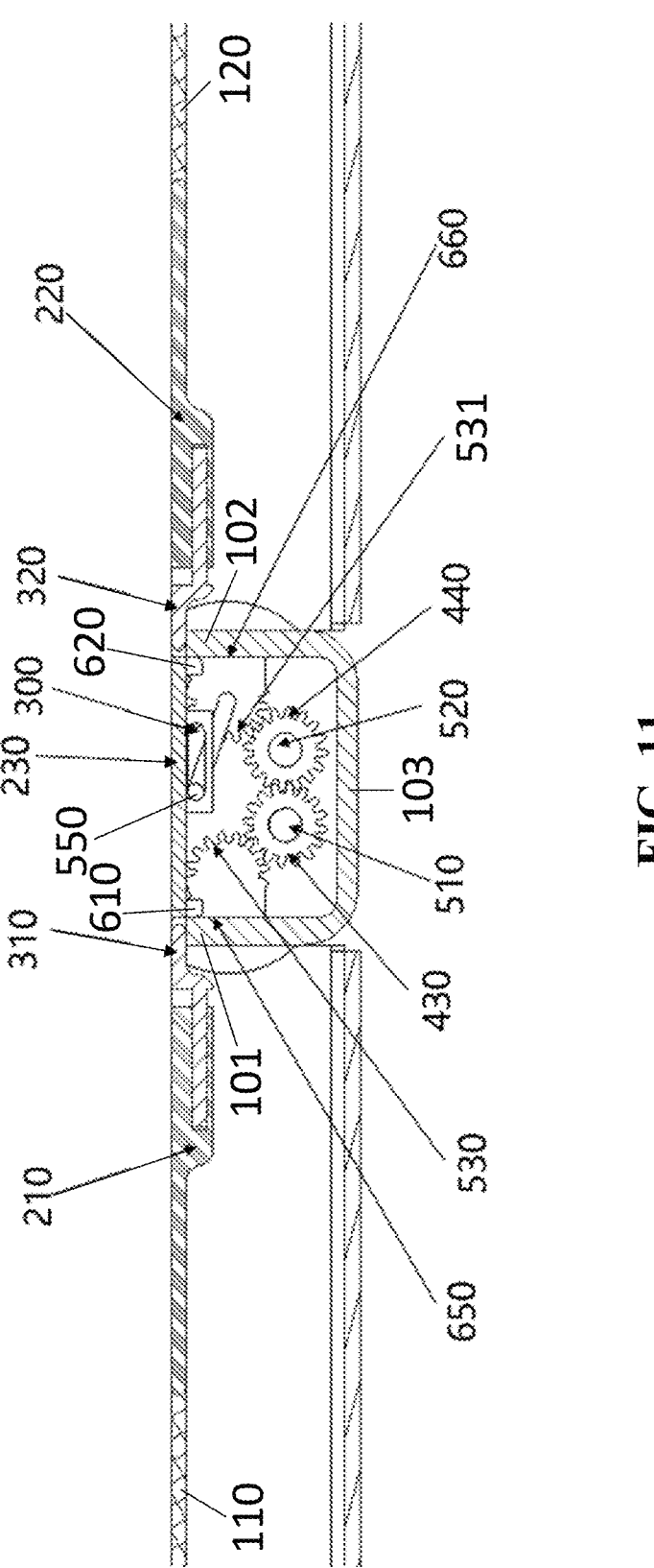
FIG. 11 is a cross-sectional side view of a pivotable support apparatus in an unfolded state in some embodiments according to the present disclosure.
Figure 12:
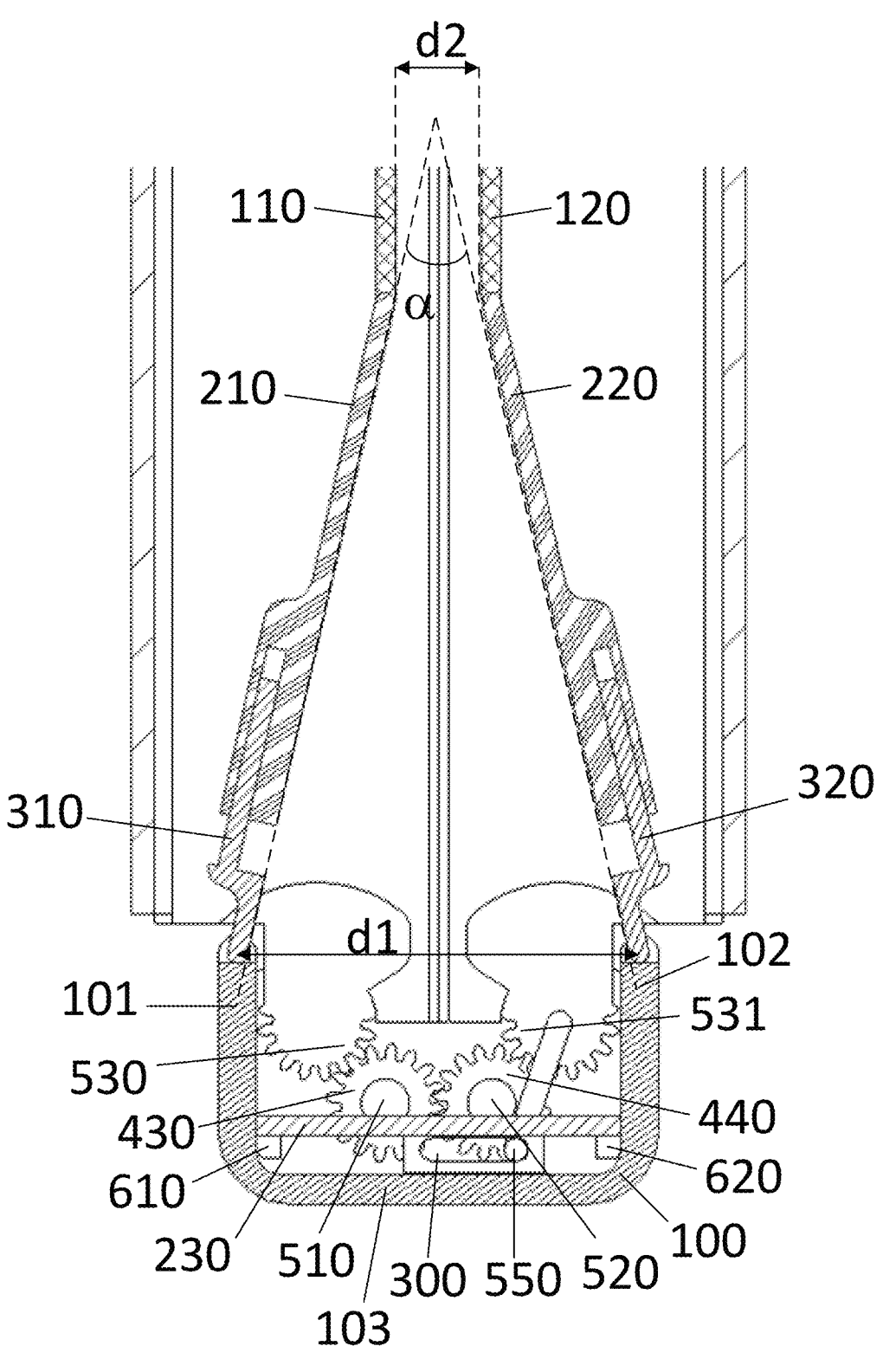
FIG. 12 is a cross-sectional side view of a pivotable support apparatus in a folded state in some embodiments according to the present disclosure.

FIG. 11 is a cross-sectional side view of a pivotable support apparatus in an unfolded state in some embodiments according to the present disclosure. FIG. 12 is a cross-sectional side view of a pivotable support apparatus in a folded state in some embodiments according to the present disclosure. Referring to FIG. 11 and FIG. 12, the pivotable support apparatus in some embodiments further includes a synchronized gear configured to synchronize rotation of the first main shaft 510 and the second main shaft 520. The synchronized gear includes a first gear 430 and a second gear 440 configured to rotate about the first main shaft 510 and the second main shaft 520, respectively. The first gear 430 and the second gear 440 are configured to be engaged with each other. The first frame 110 further includes a third gear 530 configured to be engaged with the first gear 430. The second frame 120 further includes a fourth gear 531 configured to be engaged with the second gear 440.

Similarly, on an opposite side of the first main shaft 510 and the second main shaft 520 the pivotable support apparatus may include additional gears (see, e.g., gears 410 and 420 in FIG. 4).

Referring to FIG. 8A, FIG. 8B, and FIG. 9 to FIG. 12, in some embodiments, the first rotating plate 310 is rotatably attached to the first side portion 101. In some embodiments, the first rotating plate 310 includes at least a first shaft 480, the first side portion 101 includes at least a first receiving hole 630 configured to receive the first shaft 480. The first rotating plate 310 and the first side portion 101 are configured to rotate with respect to each other about the first shaft 480. As used herein the term, "rotatably attached" signifies that two components are engaged such that the two components are mechanically coupled but may still rotate with respect to one another about an axis (e.g., about the first shaft 480). For example, the first rotating plate 310 is attached to the first side portion 101 in a manner, in which the first rotating plate 310 can be rotate between at least a first rotated position and a second rotated position.

In some embodiments, the second rotating plate 320 is rotatably attached to the second side portion 102. In some embodiments, the second rotating plate 320 includes at least a second shaft 481, the second side portion 102 includes at least a second receiving hole 640 configured to receive the second shaft 481. The second rotating plate 320 and the second side portion 102 are configured to rotate with respect to each other about the second shaft 481.

In some embodiments, the first frame 110 is rotatably attached to the first sliding plate 210. In some embodiments, the first sliding plate 210 includes at least a third shaft 470, the first frame 110 includes at least a third receiving hole 560 configured to receive the third shaft 470. The first sliding plate 210 and the first frame 110 are configured to rotate with respect to each other about the third shaft 470.

In some embodiments, the second frame 120 is rotatably attached to the second sliding plate 220. In some embodiments, the second sliding plate 220 includes at least a fourth shaft 471, the second frame 120 includes at least a fourth receiving hole 561 configured to receive the fourth shaft 471. The second sliding plate 220 and the second frame 120 are configured to rotate with respect to each other about the fourth shaft 471.

Because the first shaft 480 and the third shaft 470 are different from each other, during transitioning between an unfolded state and a folded sate of the pivotable support apparatus, the first rotating plate 310 and the first frame 110 may be at an included angle that is greater than zero, e.g., the first rotating plate 310 and the first frame 110 are non-parallel to each other. Because the second shaft 481 and the fourth shaft 471 are different from each other, during transitioning between an unfolded state and a folded sate of the pivotable support apparatus, the second rotating plate 320 and the second frame 120 may be at an included angle that is greater than zero, e.g., the second rotating plate 320 and the second frame 120 are non-parallel to each other.

In some embodiments, the first sliding plate 210 is slidably attached to the first rotating plate 310. In some embodiments, the first rotating plate 310 includes at least a first insert 450, the first sliding plate 210 includes at least a first slot 460 configured to receive the first insert 450, allowing the first sliding plate 210 to slidably move relatively to the first rotating plate 310. Optionally, in a process of unfolding the pivotable support apparatus, the first sliding plate 210 and the first rotating plate 310 are configured to move toward each other, for example, the first insert 450 inserts further into the first slot 460. Optionally, in a process of folding the pivotable support apparatus, the first sliding plate 210 and the first rotating plate 310 are configured to move away from each other, for example, the first insert 450 withdraws away from the first slot 460. As used herein the term, "slidably attached" signifies that two components are engaged such that the two components are mechanically coupled but may still slide with respect to one another. For example, the first rotating plate 310 is attached to the first sliding plate 210 in a manner, in which the first rotating plate 310 can be slid between at least a first removed position and a second inserted position.

In some embodiments, the second sliding plate 220 is slidably attached to the second rotating plate 320. In some embodiments, the second rotating plate 320 includes at least a second insert 451, the second sliding plate 220 includes at least a second slot 461 configured to receive the second insert 451, allowing the second sliding plate 220 to move relatively to the second rotating plate 320. Optionally, in a process of unfolding the pivotable support apparatus, the second sliding plate 220 and the second rotating plate 320 are configured to move toward each other, for example, the second insert 451 inserts further into the second slot 461. Optionally, in a process of folding the pivotable support apparatus, the second sliding plate 220 and the second rotating plate 320 are configured to move away from each other, for example, for example, the second insert 451 withdraws away from the second slot 461.

Because the first shaft 480 and the third shaft 470 are different from each other, during transitioning from an unfolded state to a folded sate of the pivotable support apparatus, the first frame 110 moves outward relative to the cladding board 100, in turn, the first sliding plate 210 moves away from the first rotating plate 310. During transitioning from the folded state to the unfolded sate of the pivotable support apparatus, the first frame 110 moves inward relative to the cladding board 100, in turn, the first sliding plate 210 moves closer to the first rotating plate 310. Because the second shaft 481 and the fourth shaft 471 are different from each other, during transitioning between from the unfolded state to the folded sate of the pivotable support apparatus, the second frame 120 moves outward relative to the cladding board 100, in turn, the second sliding plate 220 moves away from the second rotating plate 320. During transitioning from the folded state to the unfolded sate of the pivotable support apparatus, the second frame 120 moves inward relative to the cladding board 100, in turn, the second sliding plate 220 moves closer to the second rotating plate 320.

Figure 13A:
FIG. 13A is a perspective view of a support plate in some embodiments according to the present disclosure.
Figure 13B:
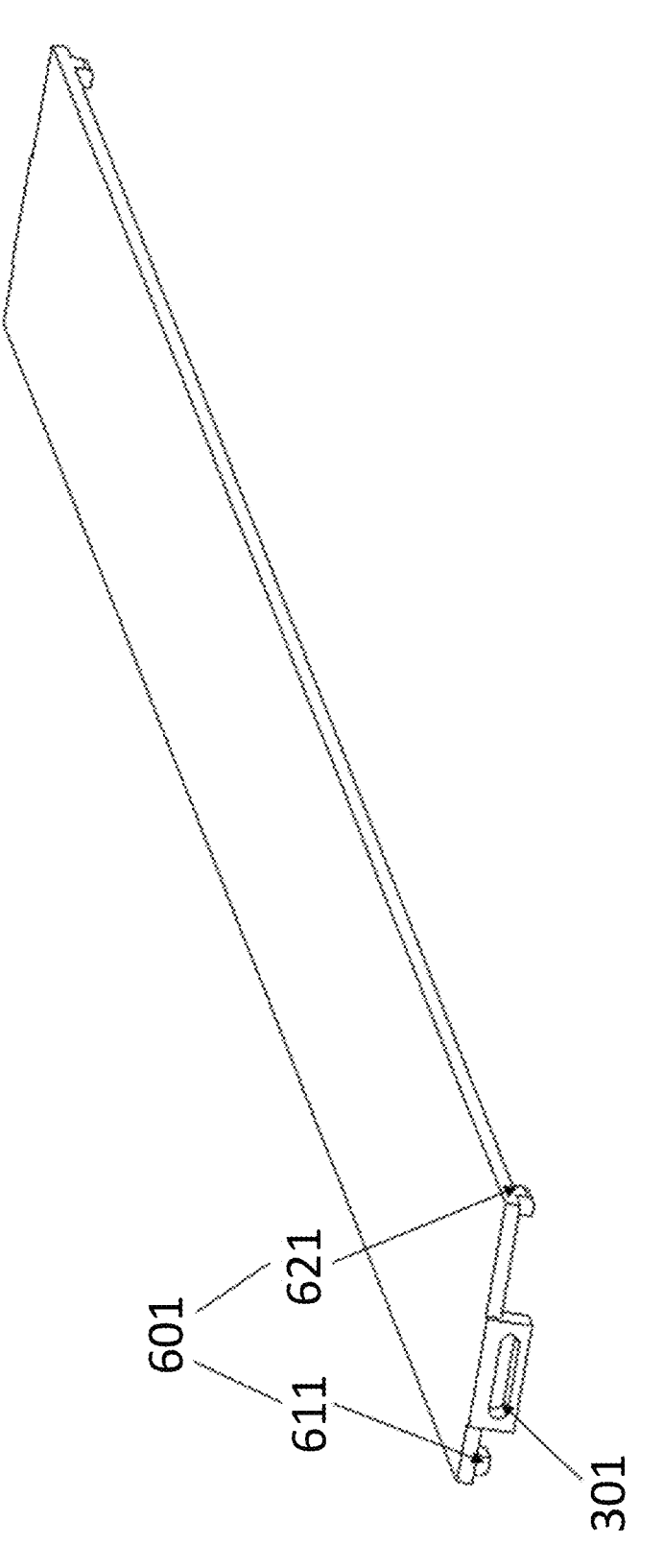
FIG. 13B is a perspective view of a support plate in some embodiments according to the present disclosure.

FIG. 13A is a perspective view of a support plate in some embodiments according to the present disclosure. FIG. 13B is a perspective view of a support plate in some embodiments according to the present disclosure. Referring to FIG. 3, FIG. 4, and FIG. 11 to FIG. 13B, the pivotable support apparatus further includes a support plate 230 received by the cladding board 100. The support plate 230 is movable between a first position and a second position. FIG. 11 shows an unfolded state of the pivotable support apparatus, in which the support plate 230 is at the first position. FIG. 12 shows a folded state of the pivotable support apparatus, in which the support plate 230 is at the second position.

In the unfolded state of the pivotable support apparatus, the support plate 230 is at the first position, the first rotating plate 310, the second rotating plate 320, the first sliding plate 210, the second sliding plate 220, and the support plate 230 form parts of a substantially flat surface for supporting the foldable display panel 130. In the folded state of the pivotable support apparatus, the support plate 230 is received between the first side portion 101 and the second side portion 102 of the cladding board 100 at the second position. As used herein, the term "substantially flat surface" may include small deviations from flat surface geometries, for example, deviations due to manufacturing processes. The term "substantially flat" is inclusive of a case of being partially convex or partially concave as well as a case of being fully flat.

In some embodiments, the cladding board 100 further includes a connecting portion 103 connecting the first side portion 101 and the second side portion 102. The support plate 230 is closer to the connecting portion 103 at the second position as compared to the first position. During transitioning from the unfolded state to the folded sate of the pivotable support apparatus, the support plate 230 moves toward the connecting portion 103. During transitioning from the folded state to the unfolded sate of the pivotable support apparatus, the support plate 230 moves away from the connecting portion 103.

Referring to FIG. 5, FIG. 6A, FIG. 6B, FIG. 11, and FIG. 12, in some embodiments, the first frame 110 includes a first limiting post 550; the second frame 120 includes a second limiting post 551. Referring to FIGS. 13A and 13B, the support plate 230 includes a first sliding slot 300 configured to receive the first limiting post 550 and a second sliding slot 301 configured to receive the second limiting post 551. As shown in FIG. 11 and FIG. 12, in some embodiments, the first limiting post 550 is configured to be slidably attached to the support plate 230. Similarly, the second limiting post 551 is configured to be slidably attached to the support plate 230.

In some embodiments, from an unfolded state to a folded state, the first limiting post 550 and the second limiting post 551 are configured to drive the support plate 230 from a first position to a second position. FIG. 11 shows an unfolded state of the pivotable support apparatus, in which the support plate 230 is at the first position. FIG. 12 shows a folded state of the pivotable support apparatus, in which the support plate 230 is at the second position. When the support plate 230 transitions from a first position to a second position, the first limiting post 550 slides in the space defined the first sliding slot 300, and the second limiting post 551 slides in the space defined the second sliding slot 301. As shown in FIG. 11 and FIG. 12, the support plate 230 at the second position is further away from where the first rotating plate 310 and the second rotating plate 320 are connected to the cladding board 100 as compared to the support plate 230 at the first position. By having the support plate 230 at the second position when the pivotable support apparatus is folded, it allows a foldable display panel to occupy more space, e.g., the space in a region between the first position and the second position available by withdrawing the support plate 230 to the second position.

Referring to FIG. 5, FIG. 6A, and FIG. 6B, in some embodiments, the first frame 110 includes a first side post 570, and the second frame 120 includes a second side post 571. Referring to FIG. 10, the cladding board 100 includes a first side receiving hole 580 configured to receive the first side post 570, thereby rotatably attaching the first frame 110 to the cladding board 100. The cladding board 100 further includes a second side receiving hole 590 configured to receive the second side post 571, thereby rotatably attaching the second frame 120 to the cladding board 100.

In some embodiments, as shown in FIG. 6A, the first limiting post 550 and the first side post 570 are connected to the third gear 530 on opposite sides of the third gear 530, respectively. As shown in FIG. 6B, the second limiting post 551 and the second side post 571 are connected to the fourth gear 531 on opposite sides of the fourth gear 531, respectively.

In some embodiments, transitioning between an unfolded state to a folded state, because the first limiting post 550 and the first side post 570 are connected to the third gear 530 of the first frame 110, and because the second limiting post 551 and the second side post 571 are connected to the fourth gear 531 of the second frame 120, the first limiting post 550, the second limiting post 551, the first side post 570, and the second side post 571 are configured to be simultaneously driven to rotate the first rotating plate 310 (through the first side post 570), rotate the second rotating plate 320 (through the second side post 571), and at the same time move support plate 230 (through the first limiting post 550 and the second limiting post 551) in the space defined by the cladding board 100.

Referring to FIG. 13A, FIG. 13B, FIG. 11, and FIG. 12, the support plate 230 in some embodiments further includes a plurality of first spacers 600 and a plurality of second spacers 601. The plurality of first spacers 600 and the plurality of second spacers 601 are on two opposite sides of the support plate 230. In one example, the plurality of first spacers 600 include first spacers 610 and 620, the plurality of second spacers 601 include second spacers 611 and 621. Referring to FIG. 11 and FIG. 12, the first spacer 610 is in contact with an inner surface of the first side portion 101, the second spacer 620 is in contact with an inner surface of the second side portion 102. The spacers limit the movement of the support plate 230 in the space defined by the cladding board 100.

Referring to FIG. 12, in a folded state of the pivotable support apparatus, a first included angle α between the first sliding plate 210 and the second sliding plate 220 or between the first rotating plate 310 and the second rotating plate 320 is greater than a second included angle between the first frame 110 and the second frame 120 (the second included angle in FIG. 12 is zero). In some embodiments, the second included angle is in a range of 0 degree to 10 degrees, e.g., 0 degree to 1 degrees, 1 degree to 2 degrees, 2 degree to 3 degrees, 3 degree to 4 degrees, 4 degree to 5 degrees, 5 degree to 6 degrees, 6 degree to 7 degrees, 7 degree to 8 degrees, 8 degree to 9 degrees, or 9 degree to 10 degrees. In some embodiments, the first included angle α is in a range of 10 degree to 75 degrees, e.g., 10 degree to 15 degrees, 15 degree to 20 degrees, 20 degree to 25 degrees, 25 degree to 30 degrees, 30 degree to 35 degrees, 35 degree to 40 degrees, 40 degree to 45 degrees, 45 degree to 50 degrees, 50 degree to 55 degrees, 55 degree to 60 degrees, 60 degree to 65 degrees, 65 degree to 70 degrees, or 70 degree to 75 degrees.

Referring to FIG. 12, in a folded state of the pivotable support apparatus, a first included angle α between the first sliding plate 210 and the second sliding plate 220 or between the first rotating plate 310 and the second rotating plate 320 is greater than a third included angle between the first side portion 101 and the second side portion 102 (the third included angle in FIG. 12 is zero). In some embodiments, the third included angle is in a range of 0 degree to 10 degrees, e.g., 0 degree to 1 degrees, 1 degree to 2 degrees, 2 degree to 3 degrees, 3 degree to 4 degrees, 4 degree to 5 degrees, 5 degree to 6 degrees, 6 degree to 7 degrees, 7 degree to 8 degrees, 8 degree to 9 degrees, or 9 degree to 10 degrees. In some embodiments, the first included angle α is in a range of 10 degree to 75 degrees, e.g., 10 degree to 15 degrees, 15 degree to 20 degrees, 20 degree to 25 degrees, 25 degree to 30 degrees, 30 degree to 35 degrees, 35 degree to 40 degrees, 40 degree to 45 degrees, 45 degree to 50 degrees, 50 degree to 55 degrees, 55 degree to 60 degrees, 60 degree to 65 degrees, 65 degree to 70 degrees, or 70 degree to 75 degrees.

In some embodiments, in a folded state of the pivotable support apparatus, the first rotating plate 310 and the second rotating plate 320 are spaced apart by a first distance d1 where they are connected to the cladding board 100, respectively. The first sliding plate 210 and the second sliding plate 220 are spaced apart by a second distance d2 where they are connected to the first frame 110 and the second frame 120, respectively. Optionally, the first distance d1 is greater than the second distance d2. Optionally, a ratio of the first distance to the second distance is in a range of 3 to 100, e.g., 3 to 4, 4 to 5, 5 to 6, 6 to 7, 7 to 8, 8 to 9, 9 to 10, 10 to 12, 12 to 14, 14 to 16, 16 to 18, 18 to 20, 20 to 25, 25 to 30, 30 to 40, 40 to 50, 50 to 60, 60 to 70, 70 to 80, 80 to 90, or 90 to 100.

In some embodiments, in both the folded state and the unfolded state of the pivotable support apparatus, upper surfaces of the first rotating plate 310 and the first sliding plate 210 are substantially co-planar; in both the folded state and the unfolded state of the pivotable support apparatus, upper surfaces of the second rotating plate 320 and the second sliding plate 220 are substantially co-planar.

In another aspect, the present disclosure provides a display apparatus. In some embodiments, the display apparatus includes a foldable display panel, and a pivotable support apparatus described herein. Optionally, the display panel is a liquid crystal display panel. Optionally, the display panel is an organic light emitting diode display panel. Optionally, the display panel is an electrophoretic display panel. Examples of appropriate display apparatuses include, but are not limited to, an electronic paper, a mobile phone, a tablet computer, a television, a monitor, a notebook computer, a digital album, a GPS, etc.

Figure 14:
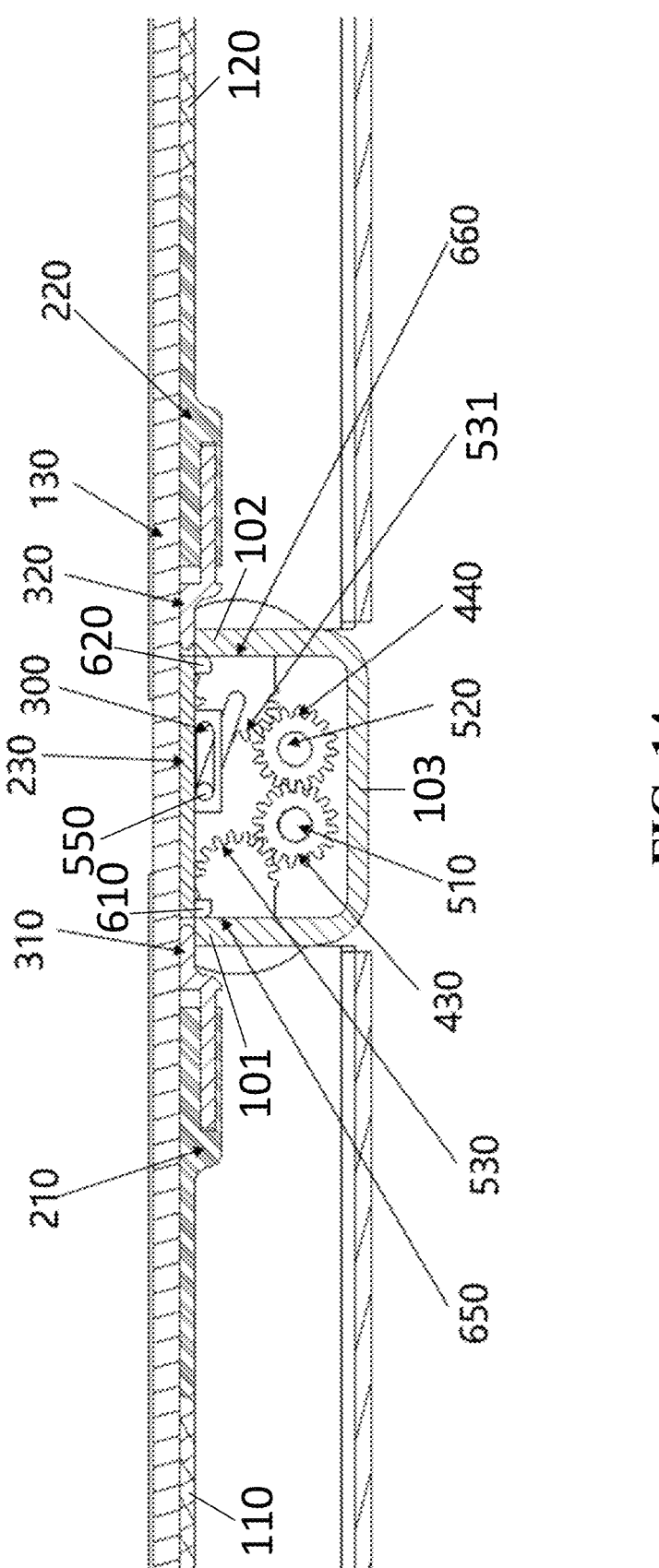
FIG. 14 is a cross-sectional side view of a display apparatus in an unfolded state in some embodiments according to the present disclosure.
Figure 15:
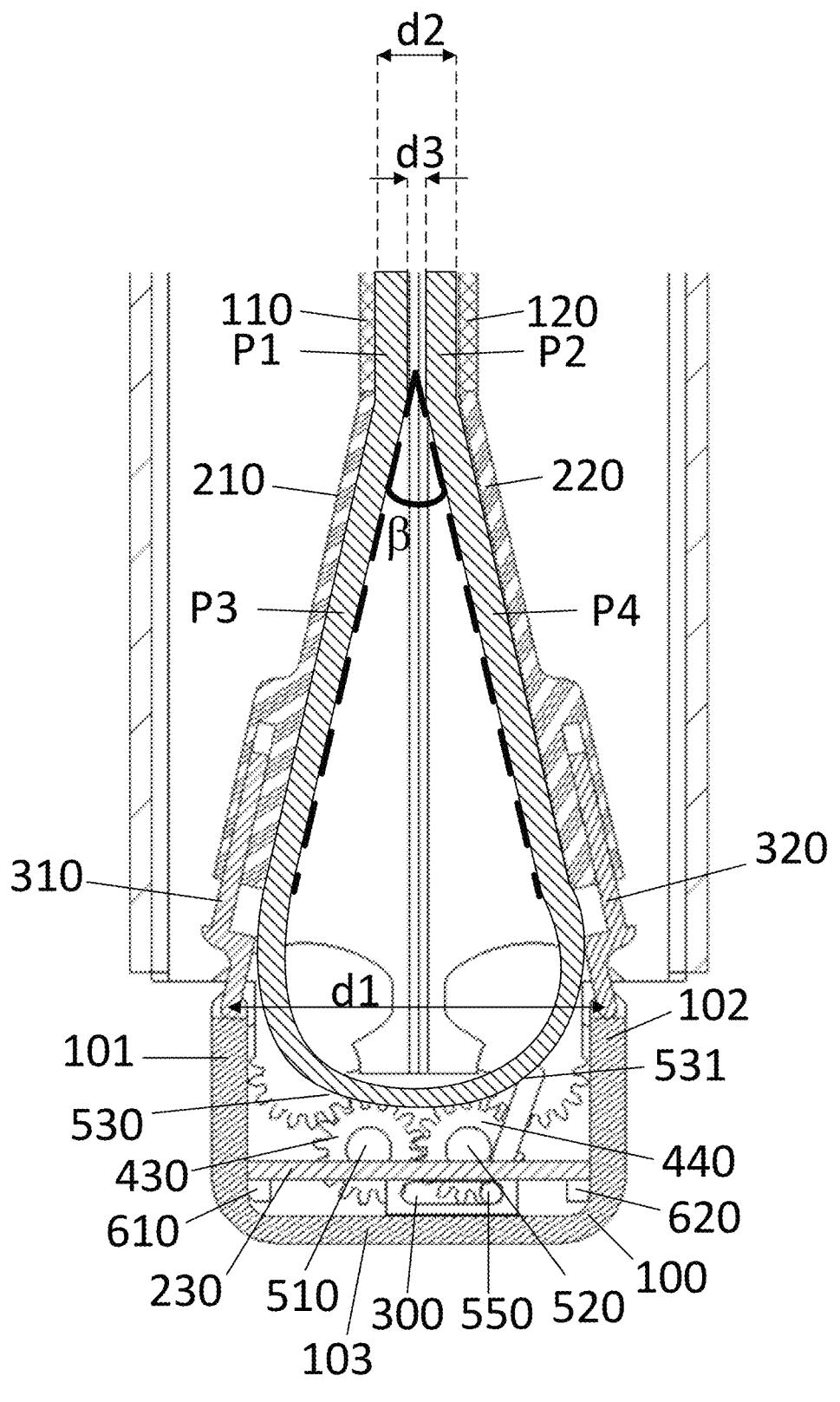
FIG. 15 is a cross-sectional side view of a display apparatus in a folded state in some embodiments according to the present disclosure.

FIG. 14 is a cross-sectional side view of a display apparatus in an unfolded state in some embodiments according to the present disclosure. FIG. 15 is a cross-sectional side view of a display apparatus in a folded state in some embodiments according to the present disclosure. Referring to FIG. 14, in the unfolded state of the display apparatus, the first rotating plate 310, the second rotating plate 320, the first sliding plate 210, the second sliding plate 220, and the support plate 230 form parts of a substantially flat surface for supporting a foldable display panel 130. Because the foldable display panel 130 is affixed on surfaces of the first rotating plate 310, the second rotating plate 320, the first sliding plate 210, the second sliding plate 220, and the support plate 230, there is an increased supporting surface area for the foldable display panel 130, the foldable display panel 130 can be supported with a higher degree of flatness.

Referring to FIG. 14, in the unfolded state of the display apparatus, upper surfaces of the first rotating plate 310, the second rotating plate 320, the first sliding plate 210, the second sliding plate 220, and the support plate 230 are substantially co-planar. As used herein, the term "substantially co-planar" refers to two or more surfaces on a structure sharing a same common plane or being offset no more than 5 mm (e.g., no more than 4 mm, no more than 3 mm, no more than 2 mm, no more than 1 mm, no more than 0.5 mm, or no more than 0.25 mm) from sharing the same common plane.

Referring to FIG. 15, in a folded state of the display apparatus, the first rotating plate 310 and the second rotating plate 320 are spaced apart by a first distance d1 where they are connected to the cladding board 100, respectively. The first sliding plate 210 and the second sliding plate 220 are spaced apart by a second distance d2 where they are connected to the first frame 110 and the second frame 120, respectively. Optionally, the first distance d1 is greater than the second distance d2. Optionally, a ratio of the first distance to the second distance is in a range of 3 to 100, e.g., 3 to 4, 4 to 5, 5 to 6, 6 to 7, 7 to 8, 8 to 9, 9 to 10, 10 to 12, 12 to 14, 14 to 16, 16 to 18, 18 to 20, 20 to 25, 25 to 30, 30 to 40, 40 to 50, 50 to 60, 60 to 70, 70 to 80, 80 to 90, or 90 to 100. A portion (P1 in FIG. 15) of the foldable display panel 130 in contact with the first frame 110 and a portion (P2 in FIG. 15) of the foldable display panel 130 in contact with the second frame 120 are spaced apart by a third distance d3. Optionally, the first distance d1 is greater than the third distance d3. Optionally, the second distance d2 is greater than the third distance d3. Optionally, a ratio of the first distance d1 to the third distance d3 is in a range of 3 to 100, e.g., 3 to 4, 4 to 5, 5 to 6, 6 to 7, 7 to 8, 8 to 9, 9 to 10, 10 to 12, 12 to 14, 14 to 16, 16 to 18, 18 to 20, 20 to 25, 25 to 30, 30 to 40, 40 to 50, 50 to 60, 60 to 70, 70 to 80, 80 to 90, or 90 to 100. Optionally, a ratio of the second distance d2 to the third distance d3 is in a range of 1.1 to 10, e.g., 1.1 to 1.2, 1.2 to 1.3, 1.3 to 1.4, 1.4 to 1.5, 1.5 to 1.6, 1.6 to 1.7, 1.7 to 1.8, 1.8 to 1.9, 1.9 to 2.0, 2.0 to 3.0, 3.0 to 4.0, 4.0 to 5.0, 5.0 to 6.0, 6.0 to 7.0, 7.0 to 8.0, 8.0 to 9.0, or 9.0 to 10.0.

Referring to FIG. 15, in a folded state of the display apparatus, a fourth included angle β between a portion (P3 in FIG. 15) of the foldable display panel 130 in contact with the first sliding plate 210 and a portion (P4 in FIG. 15) of the foldable display panel 130 in contact with the second sliding plate 220 is greater than a second included angle between the first frame 110 and the second frame 120 (the second included angle in FIG. 15 is zero). In some embodiments, the second included angle is in a range of 0 degree to 10 degrees, e.g., 0 degree to 1 degrees, 1 degree to 2 degrees, 2 degree to 3 degrees, 3 degree to 4 degrees, 4 degree to 5 degrees, 5 degree to 6 degrees, 6 degree to 7 degrees, 7 degree to 8 degrees, 8 degree to 9 degrees, or 9 degree to 10 degrees. In some embodiments, the fourth included angle β is in a range of 10 degree to 75 degrees, e.g., 10 degree to 15 degrees, 15 degree to 20 degrees, 20 degree to 25 degrees, 25 degree to 30 degrees, 30 degree to 35 degrees, 35 degree to 40 degrees, 40 degree to 45 degrees, 45 degree to 50 degrees, 50 degree to 55 degrees, 55 degree to 60 degrees, 60 degree to 65 degrees, 65 degree to 70 degrees, or 70 degree to 75 degrees.

Referring to FIG. 15, in a folded state of the display apparatus, the fourth included angle β between the portion (P3 in FIG. 15) of the foldable display panel 130 in contact with the first sliding plate 210 and the portion (P4 in FIG. 15) of the foldable display panel 130 in contact with the second sliding plate 220 is greater than a fifth included angle between the portion (P1 in FIG. 15) of the foldable display panel 130 in contact with the first frame 110 and the portion (P2 in FIG. 15) of the foldable display panel 130 in contact with the second frame 120 (the fifth included angle in FIG. 15 is zero). In some embodiments, the fifth included angle is in a range of 0 degree to 10 degrees, e.g., 0 degree to 1 degrees, 1 degree to 2 degrees, 2 degree to 3 degrees, 3 degree to 4 degrees, 4 degree to 5 degrees, 5 degree to 6 degrees, 6 degree to 7 degrees, 7 degree to 8 degrees, 8 degree to 9 degrees, or 9 degree to 10 degrees. In some embodiments, the fourth included angle β is in a range of 10 degree to 75 degrees, e.g., 10 degree to 15 degrees, 15 degree to 20 degrees, 20 degree to 25 degrees, 25 degree to 30 degrees, 30 degree to 35 degrees, 35 degree to 40 degrees, 40 degree to 45 degrees, 45 degree to 50 degrees, 50 degree to 55 degrees, 55 degree to 60 degrees, 60 degree to 65 degrees, 65 degree to 70 degrees, or 70 degree to 75 degrees.

In the folded state of the display apparatus, the foldable display panel 130 has a cross-section having a tear-drop shape. The pivotable support apparatus has a cross-section having a pseudo-tear-drop shape. A "tear-drop shape" generally refers to a shape with two straight side portions diverging at an acute angle from a lower point and an arcuate upper portion extending between the upper ends of the side portions. In one example, a "tear-drop shape" is shaped like a drop of liquid having a globular form at one end and tapering to a point at the other end, or is shaped like a falling tear like a gem, as on an earring, necklace, or ring. By having this unique structure, the thickness of the display apparatus may be significantly reduced, and the local stress to the foldable display panel 130 can also be significantly reduced particularly when the display apparatus is in a folded state.

In some embodiments, in both the folded state and the unfolded state of the display apparatus, upper surfaces of the first rotating plate 310 and the first sliding plate 210 are substantially co-planar; in both the folded state and the unfolded state of the display apparatus, upper surfaces of the second rotating plate 320 and the second sliding plate 220 are substantially co-planar.

In another aspect, the present invention provides a method of fabricating a pivotable support apparatus for supporting a foldable display panel. In some embodiments, the method includes forming a cladding board having a first side portion and a second side portion; forming a first rotating plate rotatably attached to the first side portion; forming a second rotating plate rotatably attached to the second side portion; forming a first sliding plate slidably attached to the first rotating plate; forming a second sliding plate slidably attached to the second rotating plate; forming a first frame rotatably attached to the first sliding plate; and forming a second frame rotatably attached to the second sliding plate.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A pivotable support apparatus for supporting a foldable display panel, comprising:
   a cladding board having a first side portion and a second side portion;
   a first rotating plate rotatably attached to the first side portion;
   a second rotating plate rotatably attached to the second side portion;
   a first sliding plate slidably attached to the first rotating plate;
   a second sliding plate slidably attached to the second rotating plate;
   a first frame rotatably attached to the first sliding plate; and
   a second frame rotatably attached to the second sliding plate.

2. The pivotable support apparatus of claim 1, wherein, in a folded state of the pivotable support apparatus, a first included angle between the first sliding plate and the second sliding plate or between the first rotating plate and the second rotating plate is greater than a second included angle between the first frame and the second frame.

3. The pivotable support apparatus of claim 1, wherein, in a folded state of the pivotable support apparatus, the first rotating plate and the second rotating plate are spaced apart by a first distance where they are connected to the cladding board, respectively;
   the first sliding plate and the second sliding plate are spaced apart by a second distance where they are connected to the first frame and the second frame, respectively; and
   the first distance is greater than the second distance.

4. The pivotable support apparatus of claim 1, wherein, in an unfolded state of the pivotable support apparatus, the first rotating plate, the second rotating plate, the first sliding plate, the second sliding plate form parts of a substantially flat surface for supporting the foldable display panel.

5. The pivotable support apparatus of claim 1, wherein the first rotating plate comprises at least a first insert, the first sliding plate comprises at least a first slot configured to receive the first insert, allowing the first sliding plate to slidably move relatively to the first rotating plate;
   in a process of unfolding the pivotable support apparatus, the first sliding plate and the first rotating plate are configured to move toward each other; and
   in a process of folding the pivotable support apparatus, the first sliding plate and the first rotating plate are configured to move away from each other.

6. The pivotable support apparatus of claim 1, wherein the second rotating plate comprises at least a second insert, the second sliding plate comprises at least a second slot configured to receive the second insert, allowing the second sliding plate to move relatively to the second rotating plate;
   in a process of unfolding the pivotable support apparatus, the second sliding plate and the second rotating plate are configured to move toward each other; and
   in a process of folding the pivotable support apparatus, the second sliding plate and the second rotating plate are configured to move away from each other.

7. The pivotable support apparatus of claim 1, wherein the first rotating plate comprises at least a first shaft, the first side portion comprises at least a first receiving hole configured to receive the first shaft;

the first sliding plate comprises at least a third shaft, the first frame comprises at least a third receiving hole configured to receive the third shaft;

the first rotating plate and the first side portion being configured to rotate with respect to each other about the first shaft; and the first sliding plate and the first frame being configured to rotate with respect to each other about the third shaft.

8. The pivotable support apparatus of claim 1, wherein the second rotating plate comprises at least a second shaft, the second side portion comprises at least a second receiving hole configured to receive the second shaft;

the second sliding plate comprises at least a fourth shaft, the second frame comprises at least a fourth receiving hole configured to receive the fourth shaft;

the second rotating plate and the second side portion are configured to rotate with respect to each other about the second shaft; and the second sliding plate and the second frame are configured to rotate with respect to each other about the fourth shaft.

9. The pivotable support apparatus of claim 1, further comprising a support plate received by the cladding board, the support plate being movable between a first position and a second position.

10. The pivotable support apparatus of claim 9, wherein, in an unfolded state of the pivotable support apparatus, the support plate is at the first position, the first rotating plate, the second rotating plate, the first sliding plate, the second sliding plate, and the support plate form parts of a substantially flat surface for supporting the foldable display panel; and in a folded state of the pivotable support apparatus, the support plate is received between the first side portion and the second side portion of the cladding board at the second position.

11. The pivotable support apparatus of claim 8, wherein the first frame comprises a first limiting post;

the second frame comprises a second limiting post;

the support plate comprises a first sliding slot configured to receive the first limiting post and a second sliding slot configured to receive the second limiting post;

the first limiting post is configured to be slidably attached to the support plate; and the second limiting post is configured to be slidably attached to the support plate.

12. The pivotable support apparatus of claim 11, wherein from an unfolded state to a folded state, the first limiting post and the second limiting post are configured to drive the support plate from a first position to a second position; and the support plate at the second position is further away from where a first rotating plate and a second rotating plate are connected to the cladding board as compared to the support plate at the first position.

13. The pivotable support apparatus of claim 1, wherein the first frame comprises a first side post, the cladding board comprises a first side receiving hole configured to receive the first side post, thereby rotatably attaching the first frame to the cladding board; and the second frame comprises a second side post, the cladding board comprises a second side receiving hole configured to receive the second side post, thereby rotatably attaching the second frame to the cladding board.

14. The pivotable support apparatus of claim 1, further comprising a hinge structure comprising a first main shaft and a second main shaft; and a synchronized gear configured to synchronize rotation of the first main shaft and the second main shaft.

15. The pivotable support apparatus of claim 14, wherein the synchronized gear comprises a first gear and a second gear configured to rotate about the first main shaft and the second main shaft, respectively;

the first gear and the second gear are configured to be engaged with each other;

the first frame comprises a third gear configured to be engaged with the first gear; and the second frame comprises a fourth gear configured to be engaged with the second gear.

16. The pivotable support apparatus of claim 15, wherein the first frame comprises a first limiting post and a first side post;

the first limiting post and the first side post are connected to the third gear on opposite sides of the third gear, respectively;

the second frame comprises a second limiting post and a second side post;

the second limiting post and the second side post are connected to the fourth gear on opposite sides of the fourth gear, respectively.

17. The pivotable support apparatus of claim 2, wherein the second included angle is in a range of 0 degree to 5 degrees; and the first included angle is in a range of 10 degree to 50 degrees.

18. The pivotable support apparatus of claim 3, wherein a ratio of the first distance to the second distance is in a range of 3 to 100.

19. A display apparatus, comprising a foldable display panel and a pivotable support apparatus of claim 1.

20. The display apparatus of claim 19, wherein, in a folded state of the display apparatus, the first rotating plate and the second rotating plate are spaced apart by a first distance where they are connected to the cladding board, respectively;

the first sliding plate and the second sliding plate are spaced apart by a second distance where they are connected to the first frame and the second frame, respectively;

the first distance is greater than the second distance;

a portion of the foldable display panel in contact with the first frame and a portion of the foldable display panel in contact with the second frame are spaced apart by a third distance; and the first distance is greater than the third distance.

* * * * *